United States Patent [19]

Choquet et al.

[11] Patent Number: 4,937,667

[45] Date of Patent: Jun. 26, 1990

[54] METHOD AND APPARATUS FOR PROCESSING PICTURE SIGNALS HAVING INTERLACED FIELD SCANNING

[75] Inventors: Bruno Choquet, Rennes; Pierre Siohan, Melesse, both of France

[73] Assignee: Etat Francais represente par le Ministre Delegue des Postes et Telecommunications (Centre Nationale D'Etudes Des Telecommunications), Issy Les Moulineaux, France

[21] Appl. No.: 371,602

[22] Filed: Jun. 26, 1989

Related U.S. Application Data

[63] Continuation of Ser. No. 266,387, Nov. 2, 1988, Pat. No. 4,868,655.

[30] Foreign Application Priority Data

Nov. 9, 1987 [FR] France .................................. 87 15503

[51] Int. Cl.⁵ ............................................. H04N 5/02
[52] U.S. Cl. ......................................... 358/140; 358/105
[58] Field of Search ............... 358/140, 133, 138, 105, 358/136, 160

[56] References Cited

U.S. PATENT DOCUMENTS 3,051,778  8/1962  Graham .
4,551,753 11/1985  Nishizawa et al. .................. 358/140

FOREIGN PATENT DOCUMENTS

0018856A1  5/1980  European Pat. Off. .
2489061    8/1980  France .

OTHER PUBLICATIONS

French Search Report 1984 International Zurich Seminar on Digital Communications, Applns. of Source Coding Channel Coding and Secrecy Coding, 6–8 mars 1984, (continued) Zurich/Switzerland, SwissFederal Institute of Technology, IEEE; J. DeWitte et al.: "Optimization of Addressing Bit Rate in a Multimode Coder with Motion Compensation for Broadcast Television".

*Primary Examiner*—Edward L. Coles, Sr.
*Assistant Examiner*—Victor R. Kostak
*Attorney, Agent, or Firm*—Nixon & Vanderhye

[57] ABSTRACT

With interlaced field scanned TV, a point (P) in a field at time (t+1) is determined on the basis of points situated in said field on the same vertical (C and D), and from points situated in the fields which are adjacent in time (t and t+2). The invention provides for multi-gradient motion detection, i.e. relating not only to the points on the same vertical (C and D), and to the points (A and B) having the same position as the point (P) but in the adjacent fields, but also on the basis of points (E, F, G, and H) which are vertically adjacent to the points (A and B) in the adjacent fields and occupying the same fields. Pairs of such points on either side of the point (P) can thus be defined. Interpolation is performed along each of the available pairs, and the interpolations are weighted as a function of the corresponding gradient. Hierarchical partial interpolation is performed for each of the pairs taking account of whether the point (P) is in the presence of a horizontal outline, or a quasi-horizontal outline, or no such outline.

18 Claims, 17 Drawing Sheets

FIG. 4B

METHOD AND APPARATUS FOR PROCESSING PICTURE SIGNALS HAVING INTERLACED FIELD SCANNING

This is a continuation of application Ser. No. 07/266,387, filed Nov. 2, 1988 now Pat. No. 4,868,655. The invention relates to television pictures.

BACKGROUND OF THE INVENTION

These pictures are usually produced using a so-called "interlaced scan" standard; each picture frame is split into two successive fields, which are offset in space by one half line in the vertical direction and which are offset in time by the time required to scan one field.

Interlacing suffers from several drawbacks. It considerably complicates: converting pictures from one television standard to another; space-time analysis of pictures; and also improving pictures by applying image processing techniques thereto. Image information has a three dimensional structure (two space dimensions, plus time) and when scanning is interlaced this structure is not orthogonal; a given point in a field has no equivalent in the following field; with the following field only containing points that are adjacent to the given point, with said adjacent points being absent from the field containing the given point.

It is therefore necessary to perform "deinterlacing", i.e. to convert from interlaced scanning using two successive fields to sequential scanning in which successive frames are identical in structure and superposable.

Deinterlacing makes use of interpolation between image points in space-time. Each image point or "pixel" is defined by two space co-ordinates (x along horizontal lines and y in a vertical direction perpendicular to the lines) together with a time co-ordinate (t) associated with the interlaced field or non-interlaced frame to which the pixel belongs.

There are numerous studies concerning deinterlacing, and the following may be mentioned:

J. Santillana, B. Choquet, "Algorithmes de détection et d'estimation de mouvement dans des images de télévision" (Algorithms for detecting and estimating motion in television pictures), CCETT: RTI/T/007/85/JS-BC, March 85.

B. Choquet, "Inventaire des techniques de traitement d'images en conversion de normes de représentation pour la télévision Haute Définition" (Listt of image processing techniques for conversion between picture standards in HDTV), CCETT: RTI/NT/031/86/BC, Nov. 25, 1986.

D. Pele, B. Choquet, "Algorithmes d'analyse spatio-temporelle pour Télévision Haute Définition (Algorithms for space-time analysis in HDTV), CCETT: CAL/T/002/87/DP and RTI/T/004/87/BC, April 87.

B. Choquet, P. Siohan, A. Benslimane, "Détection d'activité, dans une séquence d'images, par gradient temporel et par gradient spatial" (Detecting activity in a sequence of images by means of a time gradient and a space gradient), CCETT: RTI/T/017/85 BC and CAL/T/006/85/PS.AB, July 85.

P. Siohan, B. Choquet, "Multidimensional processing for motion detection," PCS 86: Tokyo, April 2-4, pages 65, 66, session 3.18.

B. Choquet, P. Siohan, "Enhancement techniques of a motion detector in High Definition Television," IEE, Second International Conference on Image processing and its applications, Conference publication number 265, June 24-26, 1986 (pages 215-219).

P. Siohan, B. Choquet, "Motion detection for the deinterlace in HDTV picture processing," International Eurasip Workshop on Coding of HDTV: Nov. 12-13, 1986, l'Aquila, Italy (Vol. 2).

B. Choquet, P. Siohan, "Désentrelacement par interpolations adaptatives" (Deinterlacing by adaptive interpolation), Colloquim on HDTV, Ottawa, Oct. 4-8, 1986.

D. Pele, "Quelques méthodes de segmentation d'images" (Some image segmentation methods), ENST-Bretagne: 86/LEMPAB/RCM/01.

In spite of these numerous studies, there is no deinterlace technique available at present which is simultaneously simple, fast, and effective, in particular for high definition television (HDTV) for which the image quality required in base band means that the techniques used in the past need to be thoroughly overhauled.

The criterion of simplicity relates to the number of data items that need to be taken into account when performing deinterlacing. Proposals have been made, for example, to use a lowpass linear filter whose input information is constituted by 11 frame lines (vertical aperture) over 7 fields (time aperture). It is clear that such a lowpass linear filter is at the limit of acceptable complexity.

The speed criterion relates to the speed at which the means used can act: naturally it is necessary for them to be capable of operating in real time, i.e. at least as fast as the rate at which picture information is renewed. This leads to a compromise between the amount of input information which can be taken into account and the sophistication of the means which process said information. For example, in the above-mentioned linear filter, it is practically impossible to change the interpolation parameters as a function of the local contents of a picture.

The effectiveness criterion relates to the results obtained on deinterlaced pictures. In particular, the following defects must be avoided:

loss of definition in non-moving zones of the picture, which phenomenon is particularly critical and unacceptable for an observer;

loss of definition in zones which are in motion, which becomes unacceptable whenever the eye is following the moving object;

diagonal outlines which are degraded since they are reproduced in "staircase" form; and poor reproduction or total loss of outlines which are moving quickly or very quickly.

The object of the present invention is to provide an improved method and apparatus for processing image signals, and suitable, in particular, for substantially improving the present situation in deinterlacing techniques.

The present invention is based on a method comprising the following stages:

(a) selecting a time pair and a space pair of main points about a desired point in a line to be interpolated in a field being interpolated, the main points of said time pair having the same position in the image as the desired point, but being situated in the two fields occurring immediately before and immediately after the field being interpolated, while the main points of the space pair come from the field being interpolated, from respective ones of the two positions which are vertically adjacent to the position of the desired point;
(b) calculating the "time" main difference between the signals at the two points in the time pair, and also the "space" main difference between the signals at the two points in the space pair;
(c) selecting an interpolation function taking account of said main differences; and
(d) calculating the interpolated signal of the desired point by means of said interpolation function.

In other words, it is known to take video input signals for the purpose firstly of detecting motion in a zone surrounding a point to be interpolated and secondly for selecting an interpolation function from a library of such functions. These two types of information are used for deciding on the choice of a given aglorithm and for establishing transition criteria between two different algorithms. This gives rise to a final interpolation function which is applied to the input signals or to signals derived therefrom.

For example, motion may be detected on the basis of the time main difference and the space main difference, for which various proposals have already been made in the prior art.

SUMMARY OF THE INVENTION

The present invention proceeds differently.

In a first aspect of the invention, stage (c) comprises, for each pair of main points:
(c1) selecting auxiliary points situated on the same frame line as the main points and suitable for defining auxiliary pairs of points on either side of the desired point, while simultaneously selecting a space-time zone surrounding the desired point and including the two main points and the auxiliary points associated with said two main points;
(c2) calculating auxiliary differences between the signals at the two points of each auxiliary pair;
(c3) determining first level partial interpolation in that one of the directions between the main pair and the associated auxiliary pairs which gives the minimum difference; and
(c4) determining a second level partial interpolation in the direction of the pair of main points concerned.

While stage (d) comprises:
(d1) for each pair of main points, hierarchical selection between first level partial interpolation and second level partial interpolation, as a function of the fact that said zone does not contain or does contain a local outline which is horizontal; and
(d2) calculating the final interpolated luminance of the desired product from the partial interpolations each relating to pairs of main points.

Advantageously, stage (c3) includes searching for minima not only amongst the simple differences between the signals from the two points of each pair, but also amongst linear combinations of signals from more than two points which are normed like the differences. This serves, in particular, to resolve cases where a plurality of pairs of points give the same minimum difference.

Very advantageously, operation (c1) comprises selecting two auxiliary points on one side of each main point, and two other auxiliary points on the other side of each main point, with all of the points being on the same frame line. Stage (c) then further includes the following operation:

(c4) determining a third level partial interpolation in the direction of that pair of furthest apart auxiliary points which gives a minimum difference.

Operation (d1) then comprises, for each pair of main points, selecting between first level, second level, and third level partial interpolation as a function of the fact that said zone respectively contains: no outline which is horizontal or substantially horizontal, an outline which is horizontal, or an outline which is quasi-horizontal.

It would be possible to detect the presence of a local contour by known prior techniques. However, it is particularly advantageous, in accordance with the present invention, to perform this presence detection by searching for the minimum amongst the differences or the normed linear combinations of differences. It is explained below how such a search for the minimum makes it possible to perform hierarchical selection between three levels of interpolation.

We now turn to the second aspect of the invention which is not necessarily used in conjunction with the first. According to the second aspect:
stage (a) comprises, in addition to the space pair and the time pair, selecting two "space-time" pairs each comprising two additional points on either side of the desired point, each of said additional main points being situated in the same field and in the same vertical position as one of the first-mentioned time main points, but on a frame line which is adjacent to that of said time main point in the field concerned; and
stage (b) includes calculating two space-time main differences with these two pairs of additional main points.

When the two aspects of the invention are combined, the hierarchical partial interpolation mechanism defined in stages (b) and (c) is applied not only to the space and time pairs of main points, but also to the two pairs of space-time main points.

As to the second aspect of the invention itself, it is very advantageous for the operation of both aspects to include weighted recombination of the interpolations drawn from each pair of main points as a function of the amplitude of the associated main difference relative to the sum of the main differences.

When it is applied to deinterlacing frames, the method of the invention naturally includes the following additional stage:
(e) combining each initial field with the corresponding field of interpolated points, thereby obtaining a deinterlaced frame.

The invention also provides apparatus for processing picture signals, in particular having interlaced field scanning, the apparatus comprising:
an input for sequential picture signals, providing on each occasion a signal relating to a new point situated on a given line of the incident field;
memory means for storing successive input signals in fields and in lines, in order to define a space-time window around a desired point on a line to be interpolated in a field being interpolated and preceding the incident field, said memories simultaneously providing output signals representing a time pair of main points having the same position as the desired point but respectively occupying the field immediately before and the field immediately after the field being interpolated, and a space pair of main points which are in the field being interpolated but in respective ones of the two positions vertically adjacent to the desired point;

first processing means for establishing temporary interpolations of the desired point on the basis of the outputs from the memories (the word "temporary" is used here since the prior art does not include partial interpolation in the meaning of the present invention); and second processing means also operating on the basis on the outputs from the memories in order to establish the final interpolation of the desired point from the temporary interpolations, by means of differences between the main points of said time and space pairs.

According to the invention, the memory means are extended to provide, in association with each main point, at least two auxiliary points situated on the same frame line as the main point and on either side thereof.

For each pair of main points, the first processing means are arranged to:

determine auxiliary differences between the pairs of auxiliary points associated with said main points and on either side of the desired point in space time;

calculating a first level partial interpolation in the direction of that one of the main pair and the associated auxiliary pairs which gives a minimum difference; and calculating a second level partial interpolation in the direction of the pair of main points concerned; and preferably, also calculating a third level partial interpolation in the direction of the furthest-apart pair of auxiliary points giving rise to a minimum difference;

with the second processing means providing a partial interpolation for each pair of main points by performing hierarchical selection between first level interpolation and second level interpolation (and optionally third level interpolation) as a function of a search for a minimum amongst the differences or amongst normed linear combinations of the differences relating to said pair of main points and to the associated auxiliary points.

Finally, for the various pairs of main points, performing weighted recombination of the selected partial interpolations, with weighting being performed each time as a function of the amplitude of the main difference concerned relative to the sum of the main differences.

The apparatus of the invention may include the variants already mentioned with reference to the method.

In practice, each partial interpolation may be defined as the weighted mean of two points or groups of points on which this interpolation is performed. The weighting may consist, for example, in copying one of the two points or groups of points under consideration, or else in using the half-sum of the signals from the two points or groups of points under consideration.

BRIEF DESCRIPTION OF THE DRAWINGS

An embodiment of the invention is described by way of example with reference to the accompanying drawings, in which:

FIGS. 4A and 4B are two diagrams for explaining the meaning of "main" points and "auxiliary" points as used in the present invention;

In numerous respects, the drawings include items which are geometrical and/or definitive in nature. Consequently, the drawings may be used not only to facilitate comprehension of the following detailed description, but also to contribute to the definition of the invention, where appropriate.

MORE DETAILED DESCRIPTION

Use is made below of the symbol I followed by a point name or by its point co-ordinates. This symbol represents the video signal associated with the point. The video signal is taken to be the luminance at the point or pixel, but it should be understood that color signals (chrominance) may also be involved.

Further, the following detailed description relates to a context in which the input video signals are digital. However, the person skilled in the art will understand that the invention could also be implemented using analog signals.

Figure 1A:
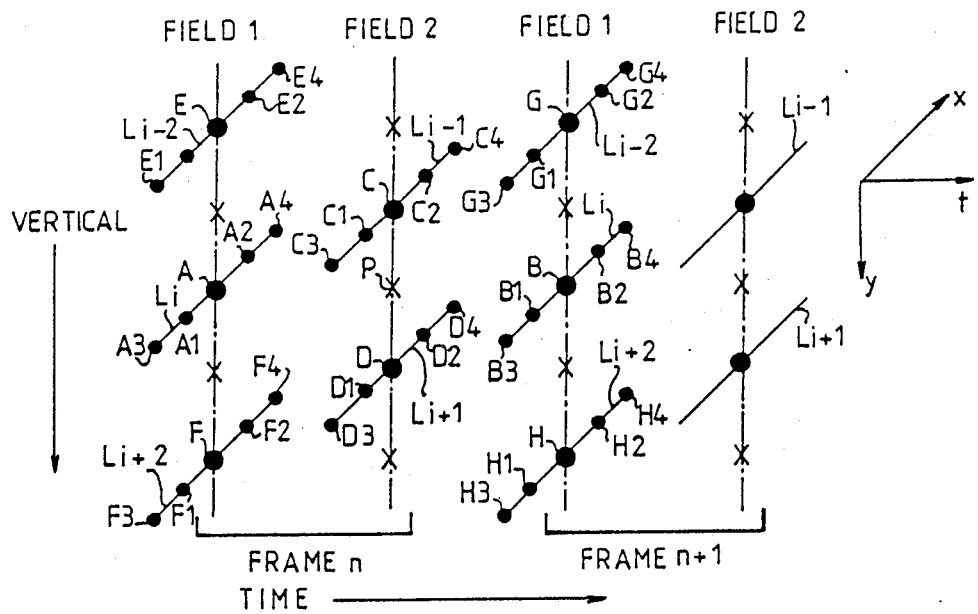
FIGS. 1A and 1B are two diagrams for describing the differences between television signals having interlaced field scanning and television signals having non-interlaced or sequential scanning.
Figure 1B:
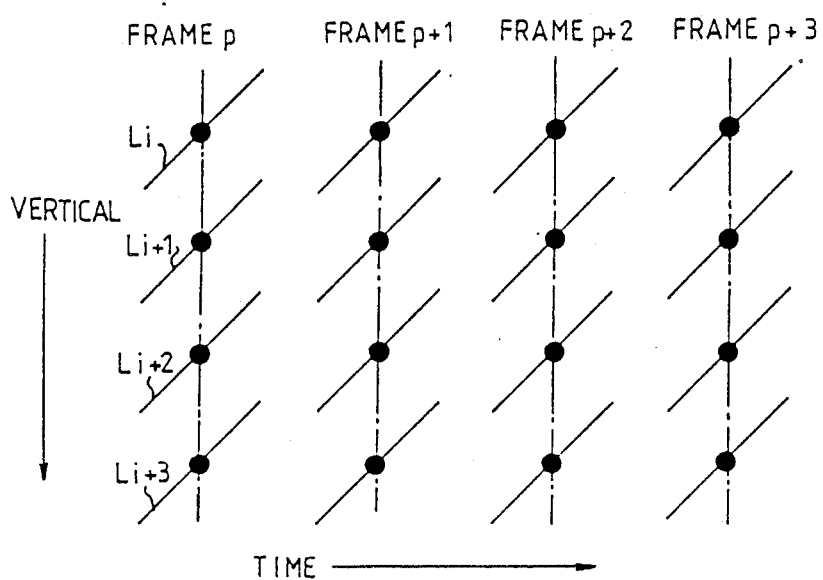

FIGS. 1A and 1B show the space-time structure of television signals.

In FIG. 1A (interlaced field scanning), each frame comprises two successive fields, namely a field 1 and a field 2. For example, field 1 includes lines Li−2, Li and Li+2 of a frame, while frame 2 contains the lines Li−1 and Li+1 which come between the lines of the preceding field. The drawing is a pseudo-perspective drawing with each field extending in an oblique x-direction and in a vertical y-direction. Successive fields appear along a horizontal t-direction which represents time.

FIG. 1B shows non-interlaced or sequential frame scanning. Each vertical scan thus includes all of the points in a given frame, i.e. all of its lines, e.g. Li to Li+3.

Deinterlacing consists in determining the points which are missing from the fields of FIG. 1A, with the missing points being marked by "x". After determining all of the points that are missing from a field, it is possible to convert each field into a complete frame by combining the lines of real points in the frame with the additional lines of interpolated points.

FIG. 1A also shows a current point to be interpolated which is referenced P.

Figure 2:
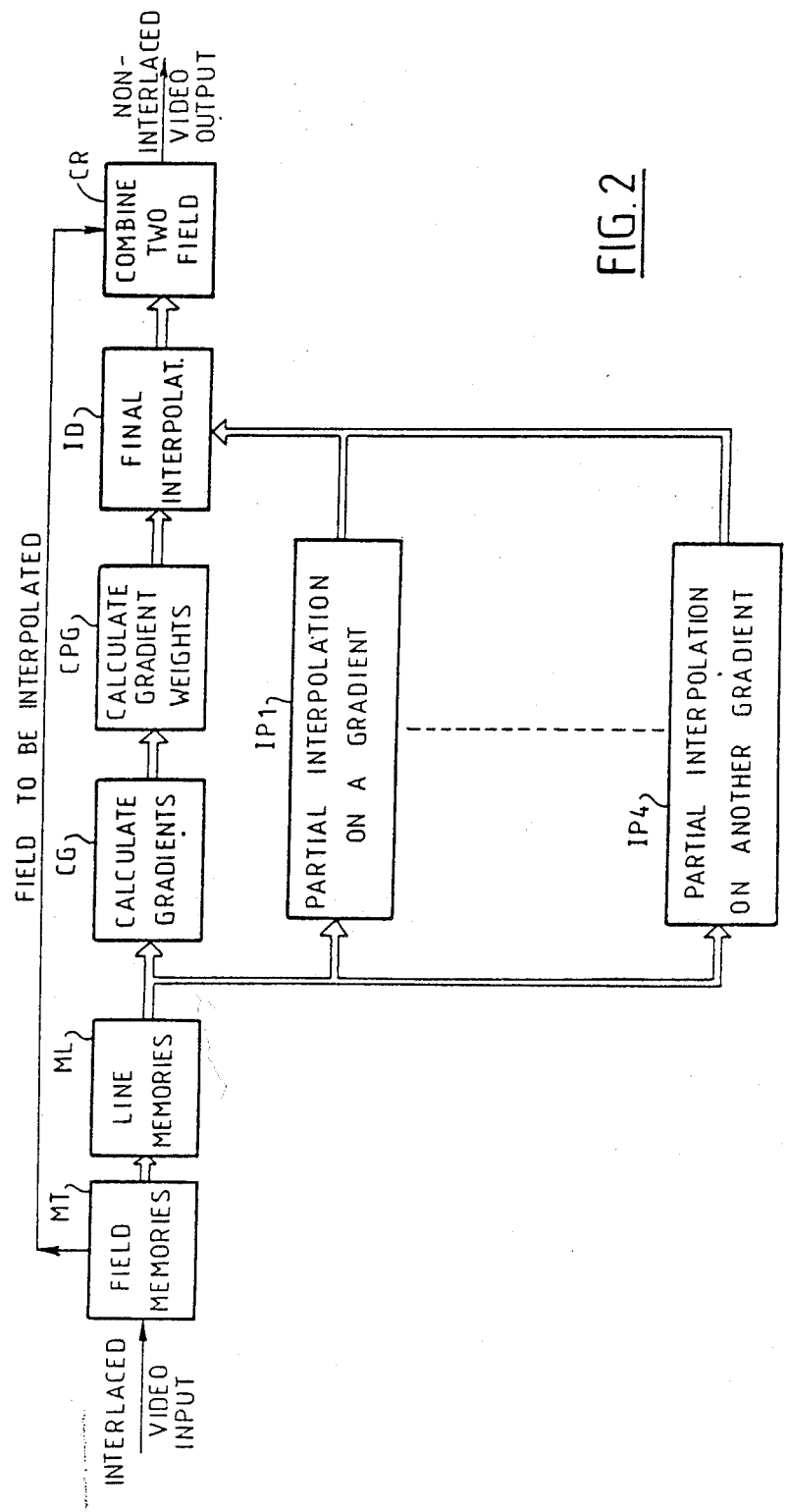
FIG. 2 is a block diagram of apparatus in accordance with the invention.
Figure 2A:
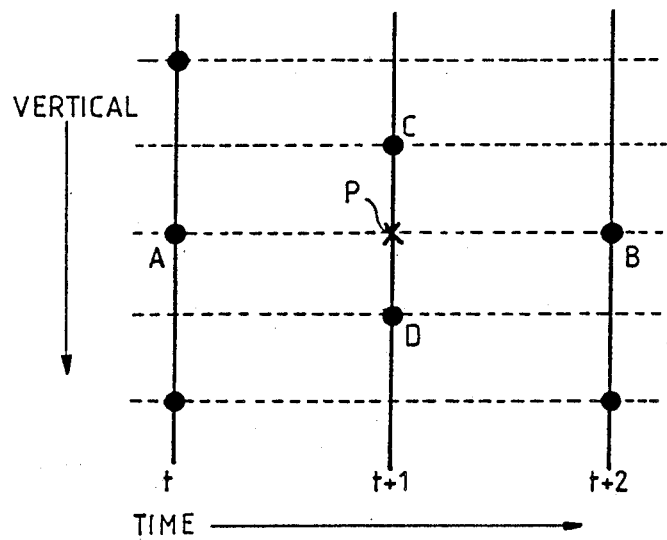
FIGS. 2A and 2B are two diagrams for describing the concept of a "main point" as used in the present invention.
Figure 2B:
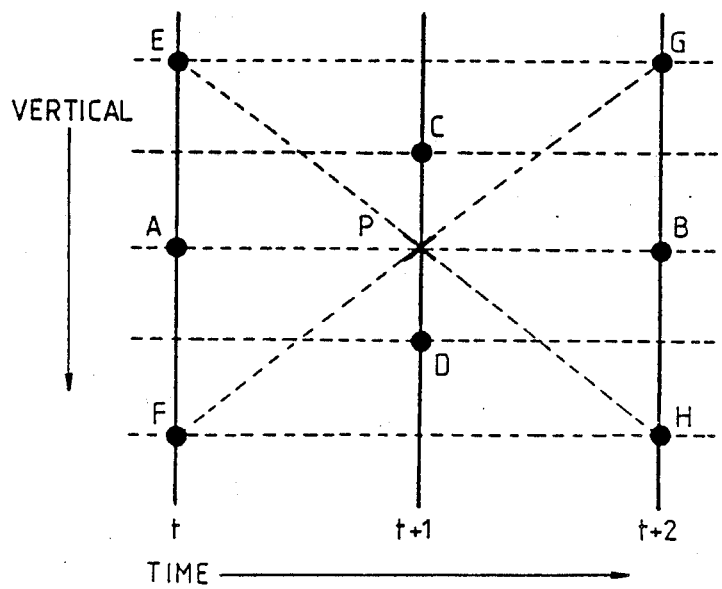

Reference is now made simultaneously to FIGS. 1A, 2A, and 2B.

FIGS. 2A and 2B correspond to FIG. 1A except that the lines in each field are no longer shown in perspective. In FIGS. 2A and 2B, these lines are assumed to be perpendicular to the plane of the figure.

It is known to associate the point to be interpolated P with the points A and B having the same position but occurring in the preceding field and in the following field respectively. The points A and B are referred to herein as "time main points".

It is also known to associate the point P with the points C and D situated on the same vertical as the point P, in the same field, but on adjacent lines. These points C and D are referred to herein as "space main points".

Some known techniques for deinterlacing include motion detection. Motion detection is a function of two differences (or gradients) respectively noted DT and DS, where:

DT is equal to the absolute value of the difference I(A)-I(B) between the luminance at points A and B; and DS is equal to the absolute value of I(C)-I(D) between the luminance at points C and D.

Such differences are frequently written below without the symbol I and the parentheses; in other words, when referring to signals, the symbol for the point also represents the image signal relating to the point.

It is then possible to define a motion detection parameter m which is a function of the two differences or gradients DT and DS. Several functions of this type have been proposed.

The point P is independently interpolated in the direction CD, e.g. using the points C and D only, and more precisely by using the mean of the signals C and D. This provides a space interpolation IS for the point P. A time interpolation IT is similarly determined, e.g. by taking the mean of the signals at points A and B.

The parameter m is then taken into account for defining a weighting law between the space interpolation IS and the time interpolation IT. There are various different forms of weighting law: hard switching (on or off), soft switching (in particular using a linear law).

One of the novel aspects of the present invention lies in motion detection being performed not only on the basis of the above-mentioned main points A, B, C, and D, but also on the basis of additional main points E, F, G, and H which appear in FIG. 1A. Since these additional main points E, F, G, and H differ from P both in time and in space, they are referred to as "space-time" points. In addition to the magnitudes DS and DT already mentioned, two other "space-time" main gradients or differences are defined, as follows:

$D\phi1$ which is the absolute value of the difference I(F)-I(G) between the signals at points F and G; and $D\phi2$ which is the absolute value of the difference I(E)-I(H) between the signals at points E and H.

Motion detection can then be performed as a function of these four gradients or differences. This turns out to be highly advantageous since working along oblique directions solves the problem of non-orthogonal outlines. In addition, this technique provides better calculation precision for interpolating the luminance of the point P.

Another essential aspect of the invention lies in the fact that hierarchical partial interpolation is performed on the various available gradients or differences, independently of each other. Although this method of hierarchical partial interpolation may be applied to the two differences DT and DS only, it is assumed below that it is always applied to all four gradients or differences DT, DS, $D\phi1$, and $D\phi2$.

Reference is now made to the block diagram of FIG. 2 which shows apparatus in accordance with the invention.

The interlaced video input signal is applied to field memories MT followed by line memories ML.

At any instant, these two memories provide a plurality of image signals or luminances which are applied firstly to a gradient calculating circuit CG and secondly to a plurality of partial interpolators IP1 to IP4. The gradient calculating circuit CG is followed by a circuit CPG for calculating gradient weights.

A final interpolation circuit ID receives the partial interpolations from the circuits IP1 to IP4 and weights them according to the weights defined by the circuit CPG in order to establish the value (or luminance signal) of the point P to be interpolated.

The field memories MT supply the field to be interpolated to a circuit CR for combining two fields, which circuit inserts the interpolated points amongst the real image points, and in the proper positions. The output video signal obtained in this way is no longer interlaced, but has the form shown in FIG. 1B after the real image points have been combined with the interpolated points.

Figure 3:
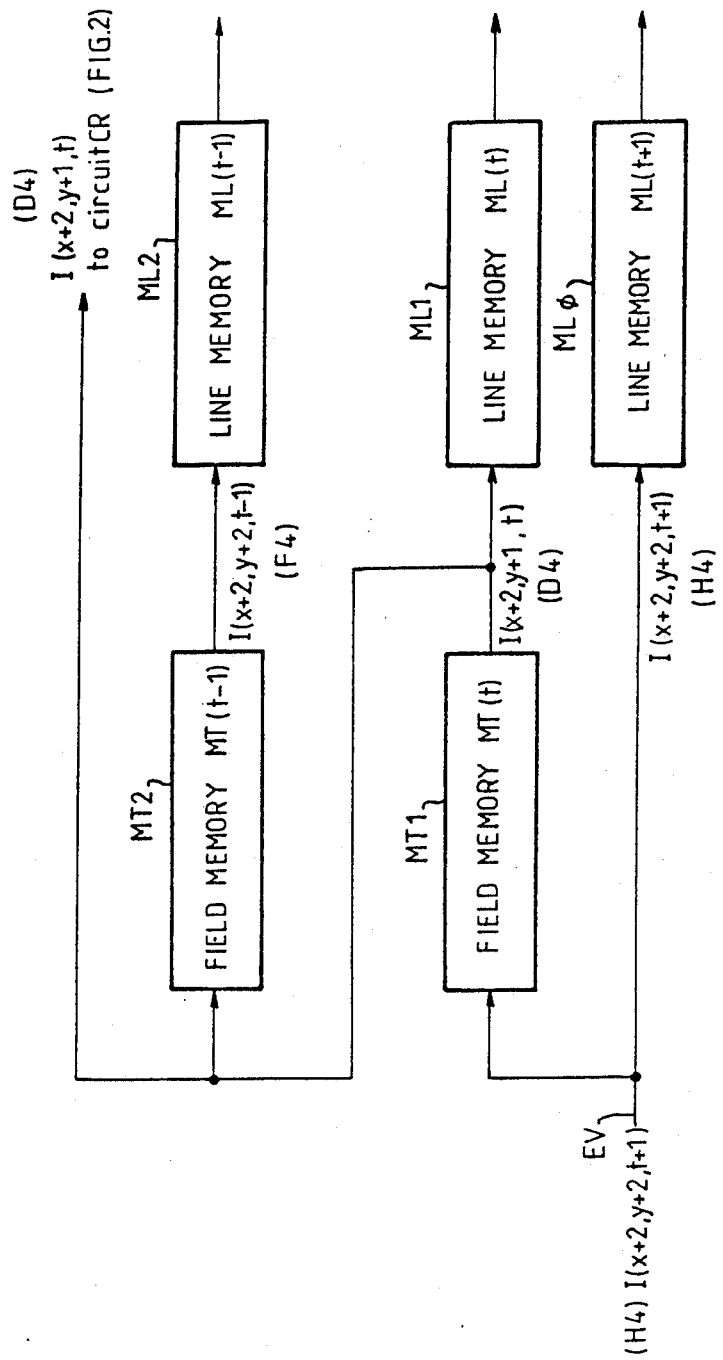
FIG. 3 is a detailed diagram of the field memories MT and the line memories ML appearing in FIG. 2.
Figure 4:
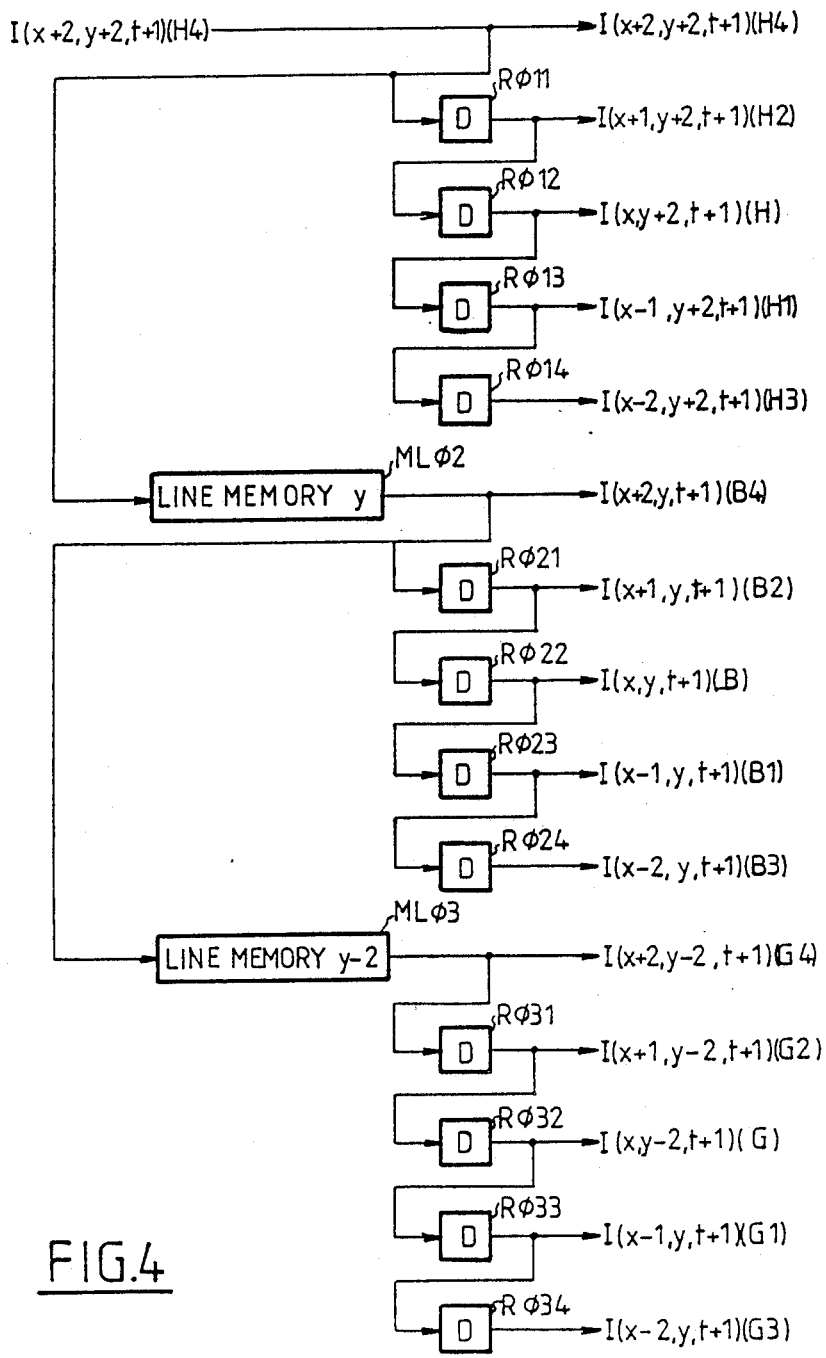
FIG. 4 is an even more detailed diagram of a line memory.

FIG. 3 shows the field memories and the line memories in greater detail, and FIG. 4 shows one of the line memories in even greater detail. In order to facilitate understanding these two figures, reference is made initially to FIGS. 4A and 4B.

Figure 4A:
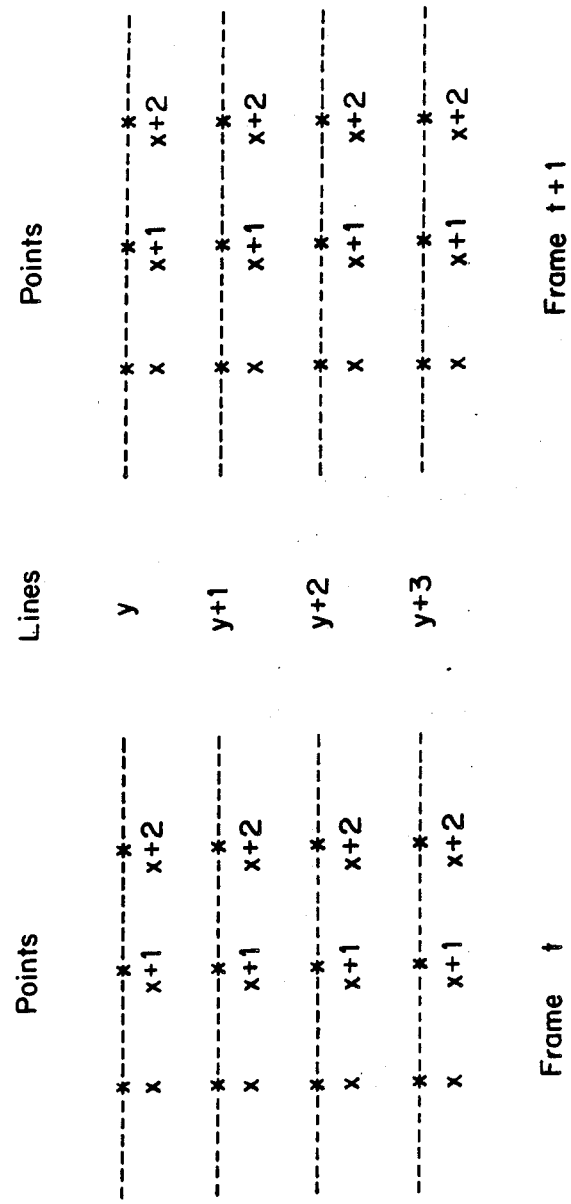

As can be seen in FIG. 4A, it is conventional to define image points by an x-co-ordinate (x, x+1, x+2) along a line with the y-co-ordinate of the line being given by y, y+1, y+2. In order to define image points completely in space and in time, it is necessary to have a time co-ordinate as well. With non-interlaced frames, there is a first frame at time t and a subsequent frame at time t+1. It is also mentioned that the x-axis and the y-axis increase as a function of time, i.e. they are determined as a function of the direction in which a beam of electrons travels to define a television picture.

Figure 4B:
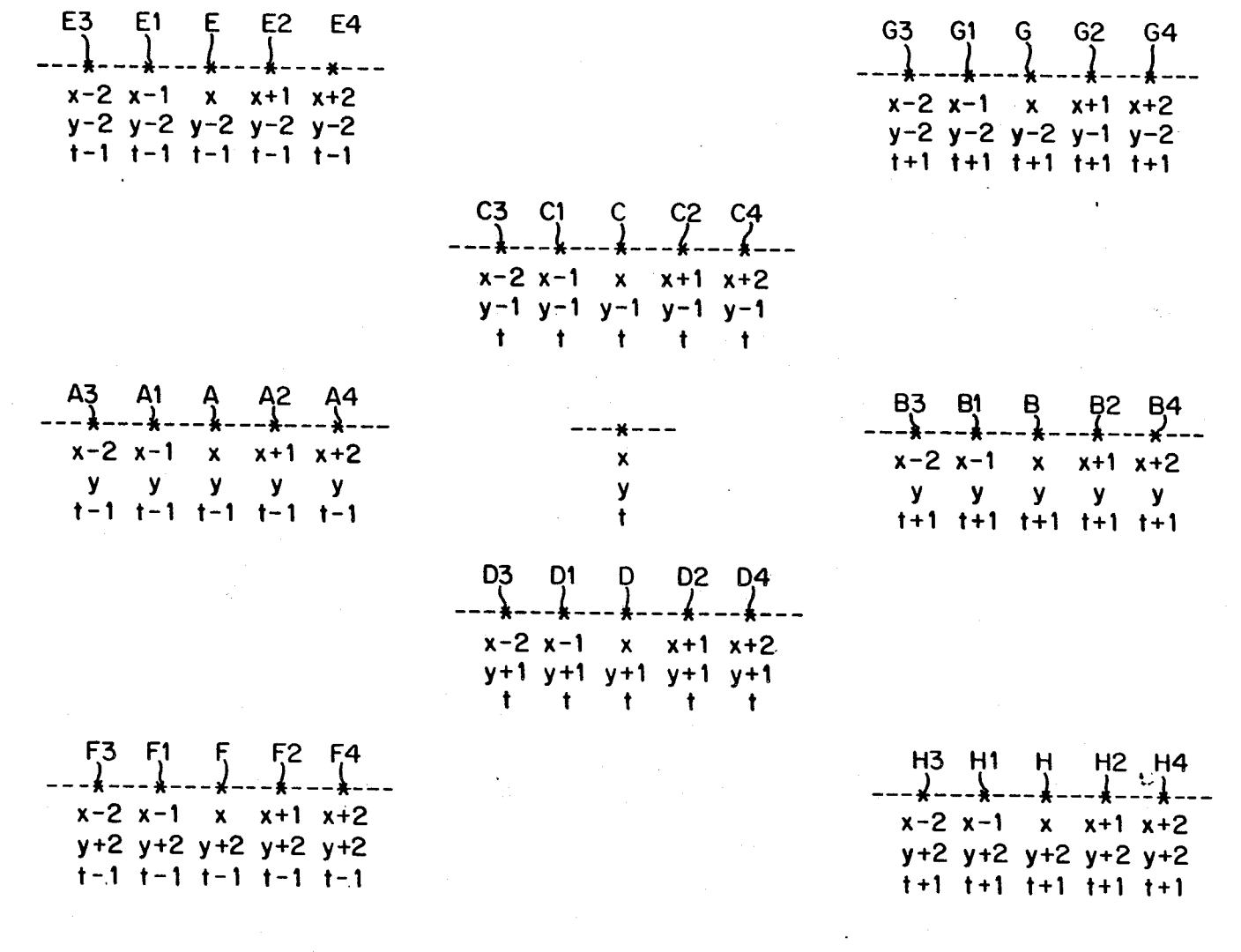

FIG. 4B shows interlaced field scanning. This figure shows the points A, B, C, D, E, F, G, and H.

Points A, E, and F belong to the field at instant t−1, in which they have co-ordinate x along the line and are to be found respectively on lines y, y−2, and y+2.

Points B, G, and H are similar to the above points except in that they are situated in the field at instant t+1.

Between these two similar fields, there is a different field existing on different lines and shown in the middle of FIG. 4B. Points C and D exist in this field at time t, they have the same x-co-ordinate along the line, but they exist on lines y−1 and y+1 respectively.

All of these points A to H are real image points. FIG. 4B also shows the point P to be interpolated whose co-ordinates are x, y, and t.

This point P to be interpolated cannot be calculated until some of the points of the following field are available, i.e. until at least the point B is available. In the embodiment described, where four gradients or differences are used, it is clear that the following field must be available at least as far as point H.

However, as described below, the present invention also makes use of auxiliary points in addition to the main points A to H. Each of these auxiliary points is associated with one of the main points and is referenced using the same letter, followed by a digit. Line points immediately adjacent to the main points are designated by the letter of the main point followed by the digit 1 or the digit 2 depending on whether they are adjacent on the upstream side or the downstream side of the main point. Two other points which are further upstream and further downstream are designated by second digits 3 and 4. This can be seen directly on examining FIGS. 1A and 4B.

Under such conditions, the invention can be implemented in the embodiment described in detail herein, only when the last point, namely H4, becomes available.

It is therefore assumed that the signal currently available at the video input EV represents the luminance I of the point whose co-ordinates are x+2, y+2, t+1. This signal is applied to a line memory ML$\phi$ relating to the corresponding field. A field memory MT1 provides a delay equal to the duration of one complete field, such that its output signal has the co-ordinates x+2, y+1, and t, which corresponds to the point D4. The output from the field memory MT1 is connected to the input of a second field memory MT2 which in turn provides the luminance at the point whose co-ordinates are x+2, y+2, t−1, i.e. the point F4.

The co-ordinates of the point D4 are also applied to the output circuit CR of FIG. 2.

When the input signals are digital, the field and line memories are naturally digital memories. When the signals are analogued, delay lines may be used.

Using each of the points made available in this way, together with other delays which are shorter, the line memories ML$\phi$, ML1, and ML2 serve to provide other points.

FIG. 4 relates to the structure of line memory ML$\phi$, with the other line memories having the same structure.

Line memory block ML$\phi$ includes two memories ML$\phi$2 and ML$\phi$3 each providing a delay equal to the time required to scan one line.

The input to line memory block ML$\phi$ is the signal for point H4.

The block ML$\phi$ includes two other line memories ML$\phi$2 and ML$\phi$3 which then provide the signals relating to points B4 and G4 respectively.

The remainder of FIG. 4 comprises delay circuits each imparting a time delay D equal to the time required to go from one line point to the following point along the same line. Thus, going from the output of memory ML$\phi$1, circuits R$\phi$11 to R$\phi$14 respectively provide the points H2, H, H1, and H3.

Circuits R$\phi$21 to R$\phi$24 and R$\phi$34 do the same from the outputs of memories ML$\phi$2 and ML$\phi$3, respectively.

When the luminances of the points available at the output of FIG. 4 are examined, it can be seen that this line memory ML$\phi$ provides all of the points required for the field of time t+1.

A circuit identical to that shown in FIG. 4 can be used for line memory ML2. This provides all of the points required in the field of time t−1.

The structure of the memory ML1 is a little simpler: it is obtained, starting from the diagram shown in FIG. 4, by omitting the memory ML$\phi$3 and its delays R$\phi$31 to R$\phi$34. Then, output point co-ordinate y+2 is replaced by y+1 and co-ordinate y is replaced by y−1, and the time co-ordinate t+1 is replaced by time co-ordinate t.

All of the points required in the field containing the looked-for point P are now available.

Figure 5:
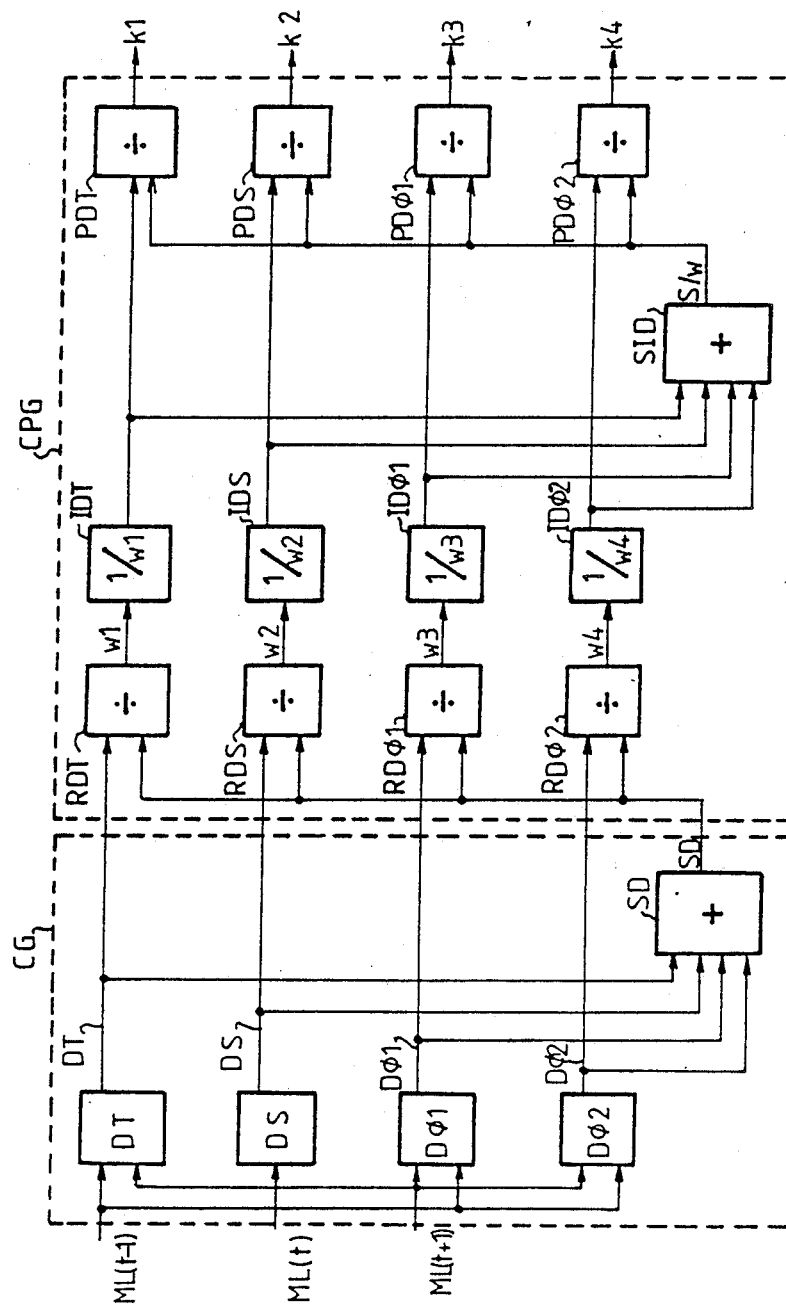
FIG. 5 is a detailed diagram of the circuits CG and CPG shown in FIG. 2.
Figure 6:
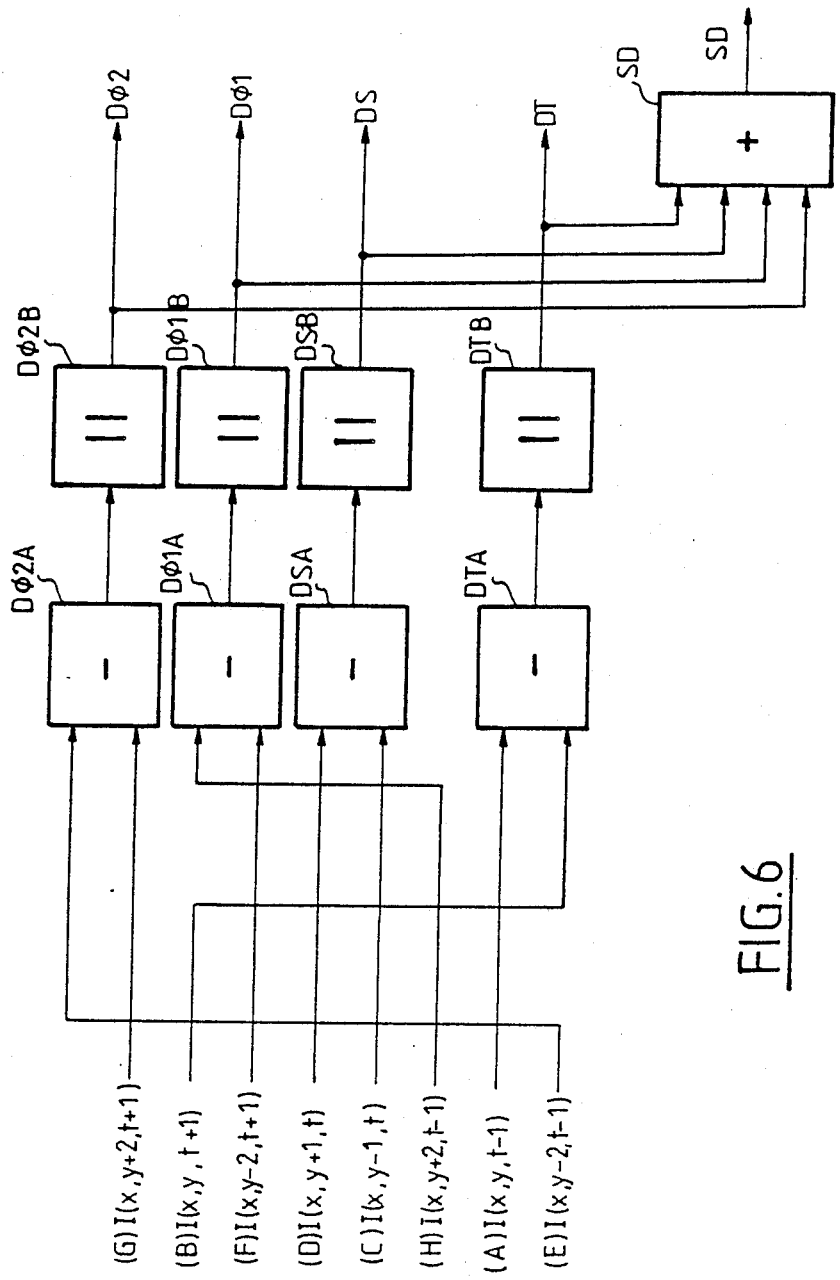
FIG. 6 is a more detailed diagram of the circuit CG shown in FIG. 5.

The circuit CG in FIGS. 2 and 5 is now described in greater detail with reference to FIG. 6. As can be seen, it makes use of the main points only. For example, for points A and B, a circuit DTA provides the algebraic differences between the luminances at these two points. The circuit DTA is followed by a circuit DTB which provides the absolute value of this algebraic difference, i.e. DT.

The circuits DSA, DSB, D$\phi$1A, D$\phi$1B, and D$\phi$2A, D$\phi$2B do the same to provide the absolute value differences or gradients DS, D$\phi$1, and D$\phi$2.

Finally, an adder circuit SD provides the sum of these three gradients which is also designated by SD.

Returning now to FIG. 5, the four differences DS, DT, D$\phi$1, and D$\phi$2 and their sum SD are applied to the circuit CPG. This circuit includes dividers RDT, RDS, RD$\phi$1, and RD$\phi$2 which receive the signals DT, DS, D$\phi$1, and D$\phi$2 respectively as the quantities to be divided and the sum SD as the dividing quantity. The ratios obtained in this way are referenced respectively w1 to w4. Reciprocal circuits IDT, IDS, ID$\phi$1, and ID$\phi$2 provide the reciprocals of these quantities, respectively. A circuit SID sums these reciprocals, with the sum signal being referenced S/w. Finally, divider circuits PDT, PDS, PD$\phi$1, and PD$\phi$2 receive the reciprocals 1/w1, 1/w2, 1/w3, and 1/w4 as quantities to be divided and the reciprocal sum S/w as the dividing quantity in order to provide respective weighting coefficients k1 to k4.

The person skilled in the art will understand that this serves to detect motion on the basis of the four available gradients or differences. Other methods exist for designing such motion detection. It is considered particularly simple to norm the four gradients relative to their sum.

The final weighting coefficients k1 to k4 are then sought for application to partial interpolations IT, IS, I$\phi$1, and I$\phi$2, respectively. The way in which these partial interpolations are preferably obtained in accordance with the invention is described below.

In order to perform an interpolation in the manner described above, it is necessary for the coefficients to satisfy the following two equations:

k1+k2+k3+k4=1 k1w1=k2w2=k3w3=k4w4

The embodiment described above is only one particular solution of these two equations. The person skilled in the art will understand that other solutions exist and may also be used for implementing the invention.

The above description concerns the first novel aspect of the invention, i.e. using four gradients or differences for the purpose of detecting motion, and then weighting four partial interpolations respectively performed in the directions associated with the same pairs of main points that were used for establishing the four gradients.

The manner in which each of these four partial interpolations is obtained is now obtained in accordance with the other novel aspects of the invention, namely hierarchical selection between several interpolation levels, and this applies to each partial interpolation.

Figure 7:
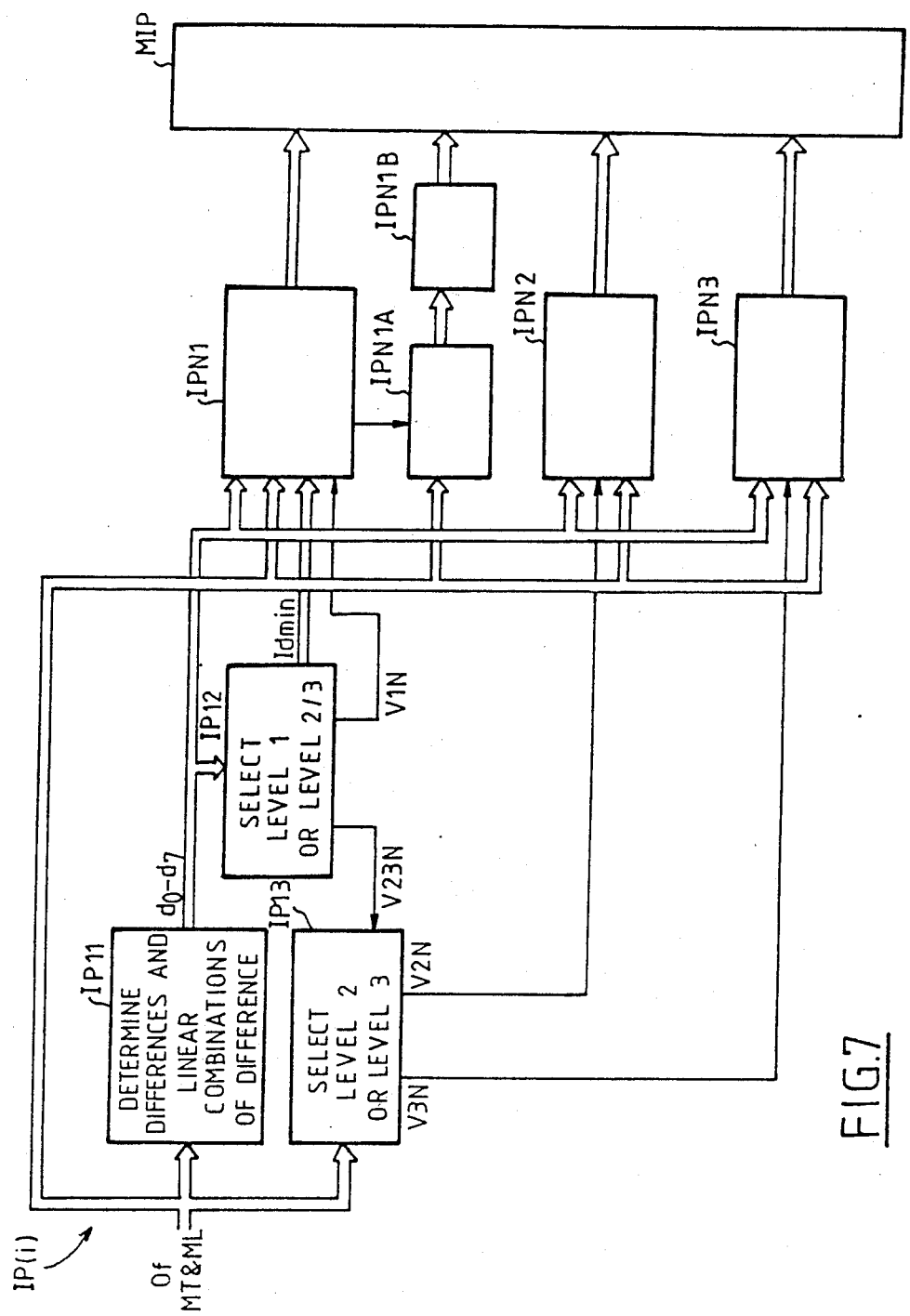
FIG. 7 is a block diagram of one of the partial interpolators IPi shown in FIG. 2.

FIG. 7 is a block diagram of one of the four partial interpolators IP1 to IP4 shown in FIG. 2.

The input signals come from the memories MT and ML. They differ depending on which partial interpolator is under consideration.

Each of these partial interpolators makes use of a pair of main points, together with the four auxiliary points associated with each of the main points.

For example, the partial interpolator for the time difference DT makes use of the main points A and B and of auxiliary points A1 to A4 and also B1 to B4. The second partial interpolator uses the points C and D together with auxiliary points associated therewith.

The third partial interpolator uses the points E and H together with associated auxiliary points.

The fourth partial interpolator uses the points F and G together with associated auxiliary points.

The three partial interpolators associated with the time difference and with the space-time differences (points A and B, and also points E to H) need signals taken both from field t−1 and from field t+1. In contrast, the space partial interpolator relating to points C and D only requires signals taken from the field currently being interpolated, i.e. relating to instant t.

FIG. 7 shows that each partial interpolator thus receives input signals relating to the main points and the auxiliary points with which it is associated. A circuit IP11 takes these input signals and determines differences and normed linear combinations of differences which are referenced d0 to d7. The person skilled in the art will understand that normed linear combinations of differences may also be considered as weighted means of differences.

A circuit IP12 uses some of these differences to perform hierarchical selection between interpolation at a level 1, or else interpolation at one or other of levels 2 and 3. In this respect, it may be observed that it would also be possible to operate the apparatus in accordance with the invention making use of interpolations at levels 1 and 2, only. However, it is considered to be greatly preferable to make use of interpolation at level 3 as well since this provides a considerable improvement in the visual results obtained after deinterlacing.

The signal V1N enables partial interpolation at level 1. The signal V23N validates the circuit IP13 which, uses some of the input signals to select between levels 2 and 3, which levels are respectively enabled by lines V2N and V3N.

A first level interpolator level IPN1 is enabled by line V1N. It performs interpolation on the basis of some of the signals d0 to d7 and some of the input signals. It is shown below that this circuit needs some of the difference signals in order to determine the direction in which it is to perform interpolation. To this end, it looks for a minimum amongst the differences. In the event of ambiguity between two minima, it is preferable to provide auxiliary circuits referenced IPN1A and IPN1B for performing first level (i.e. level 1) partial interpolation.

Second level (i.e. level 2) interpolation is performed by the circuit IPN2 as enabled by the signal V2N, and it receives the input signals and/or the difference signals.

Third level (i.e. level 3) partial interpolation is performed by the circuit IPNP3 which also receives the input signals and the difference signals and which is enabled by the signal V3N.

The circuit IPN3 also performs interpolation by selecting a direction as a function of the minima, and it may need to be paralleled like the circuit IPN1 in the event of minima ambiguity.

The set of interpolations thus made available is applied to a multiplexer MIP which may be constituted merely by switching the outputs from the various interpolators as a function of which of the interpolation level enabling signals is currently active. A variant consists merely in interconnecting the outputs from the interpolators and in activating the output from only that one of the partial interpolators whose level has been enabled.

Figure 7A:
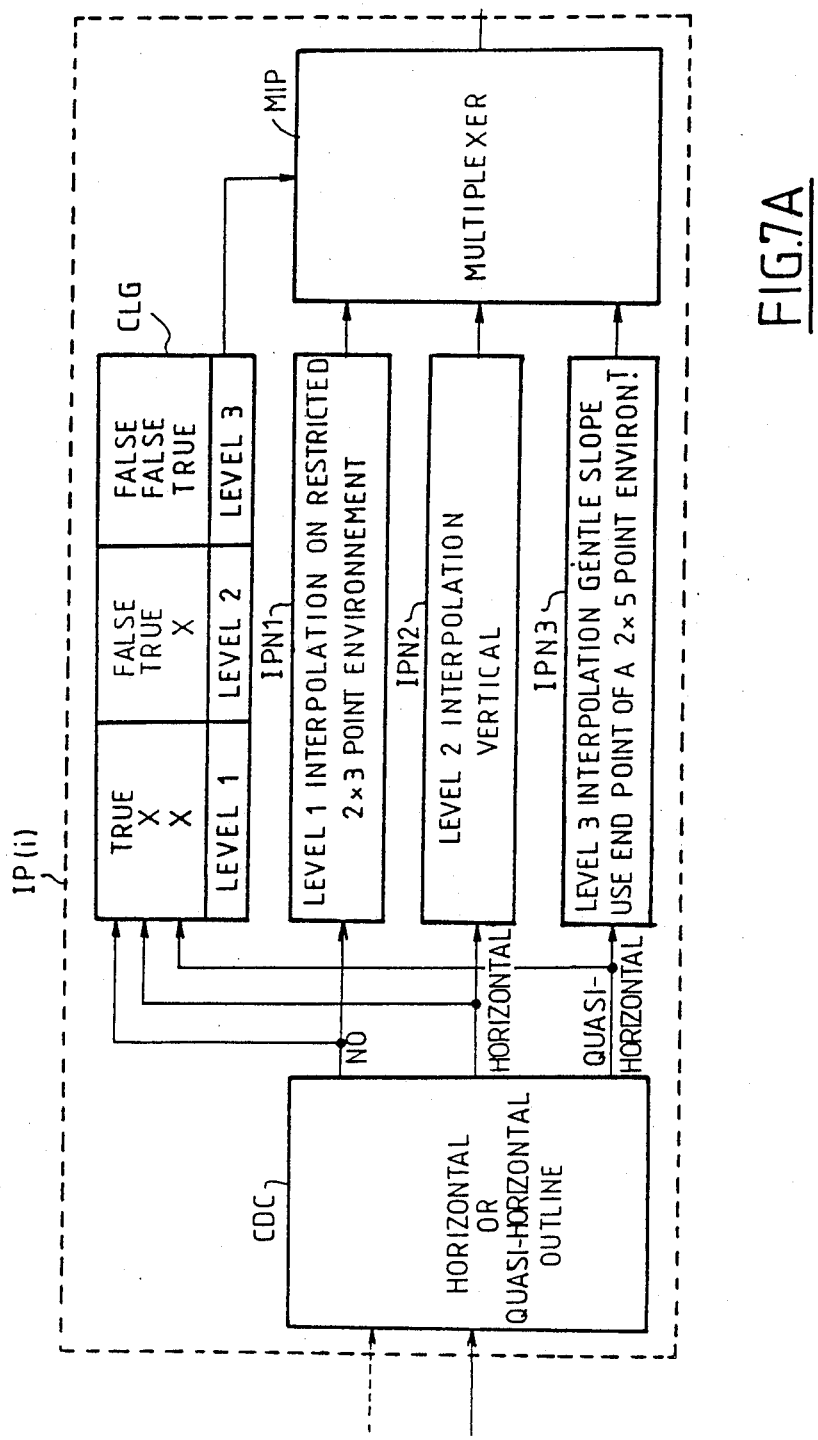
FIG. 7A is a functional diagram corresponding to FIG. 7 for explaining how the partial interpolator works.

FIG. 7A is a functional illustration of what takes place in a partial interpolator. The input signals from one or both field memories and from the associated line memories are applied to a functional block CDC which looks for the presence of a horizontal or quasi-horizontal outline in the zone of points under consideration.

If there is no outline of this type, then the first level interpolator IPN1 is enabled. It operates on a restricted environment of 2×3 points, and the direction of this environment is selected as a function of minima criteria described below.

If a horizontal outline is present, then the second level interpolator is enabled. It performs vertical interpolation only, i.e. between points C and D.

It is preferable, but not essential, when in the presence of a quasi-horizontal outline to operate a third level interpolator IPN3 which operates on the end points of a 2×5 point environment, i.e. the pair EH or the pair FG relative to the point to be interpolated P.

A logic control and monitor circuit CLG responds to the detection of an outline by operating the multiplexer MIP in order to select the output from one only of the interpolation levels IPN1 to IPN3.

This functional diagram is helpful in understanding the invention. However, the person skilled in the art will understand that the circuits of the partial interpolators must be capable of operating fast enough to enable the various magnitudes required for the final interpolation to be calculated in real time.

Further, the items required by the various functions illustrated in FIG. 7A are common to some extent. That is why the structural diagram of FIG. 7 is fairly different from the functional diagram of FIG. 7A.

In the detailed description below of the partial interpolators, specific mention is made of the partial interpolator concerned with the vertical space direction defined by the pair of points C and D.

Figure 8:
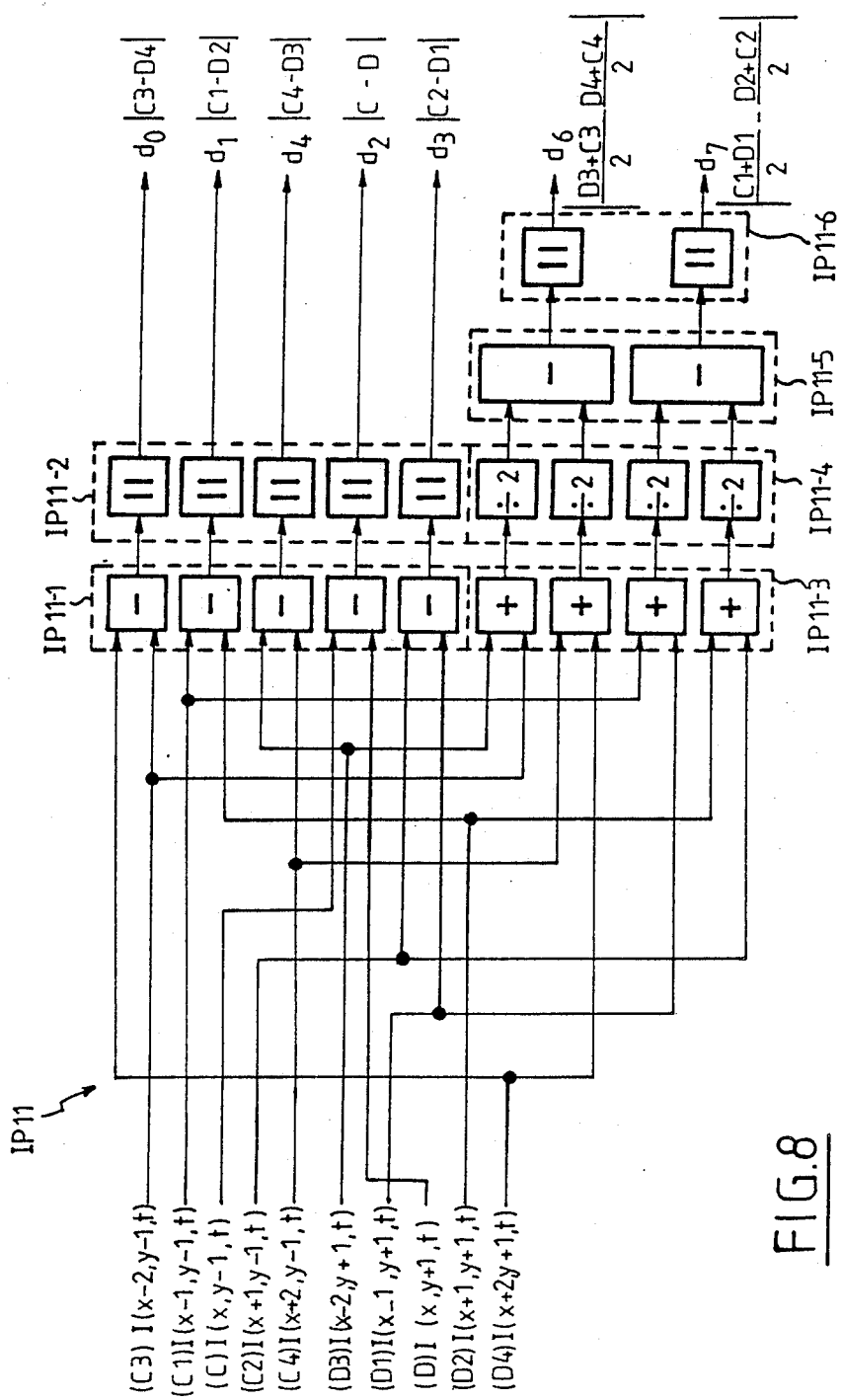
FIGS. 8 to 10 are detailed diagrams of the circuits IP11, IP12, and IP13, respectively, as shown in FIG. 7.

FIG. 8 is a detailed diagram of the block IP11 in FIG. 7. The input signals relate to main points C and D and to the auxiliary points associated therewith. Subtractors IP11-1 followed by absolute value circuits IP11-2 provide the differences d0 to d4 which relate to the following pairs of points respectively C3-D4, C1-D2, C-D, C2-D1, and C4-D3.

FIG. 8 also shows adders IP11-3 followed by divide by two circuits IP11-4, subtractors IP11-5 and absolute value circuits IP11-6, which together provide the differences d6 and d7. The difference d6 is considered as being the weighted mean of the differences observed on the pairs C3-D4 and C4-D3. The difference d7 is considered as being the weighted mean of the differences observed on the pairs C1-D2 and C2-D1.

Figure 9:
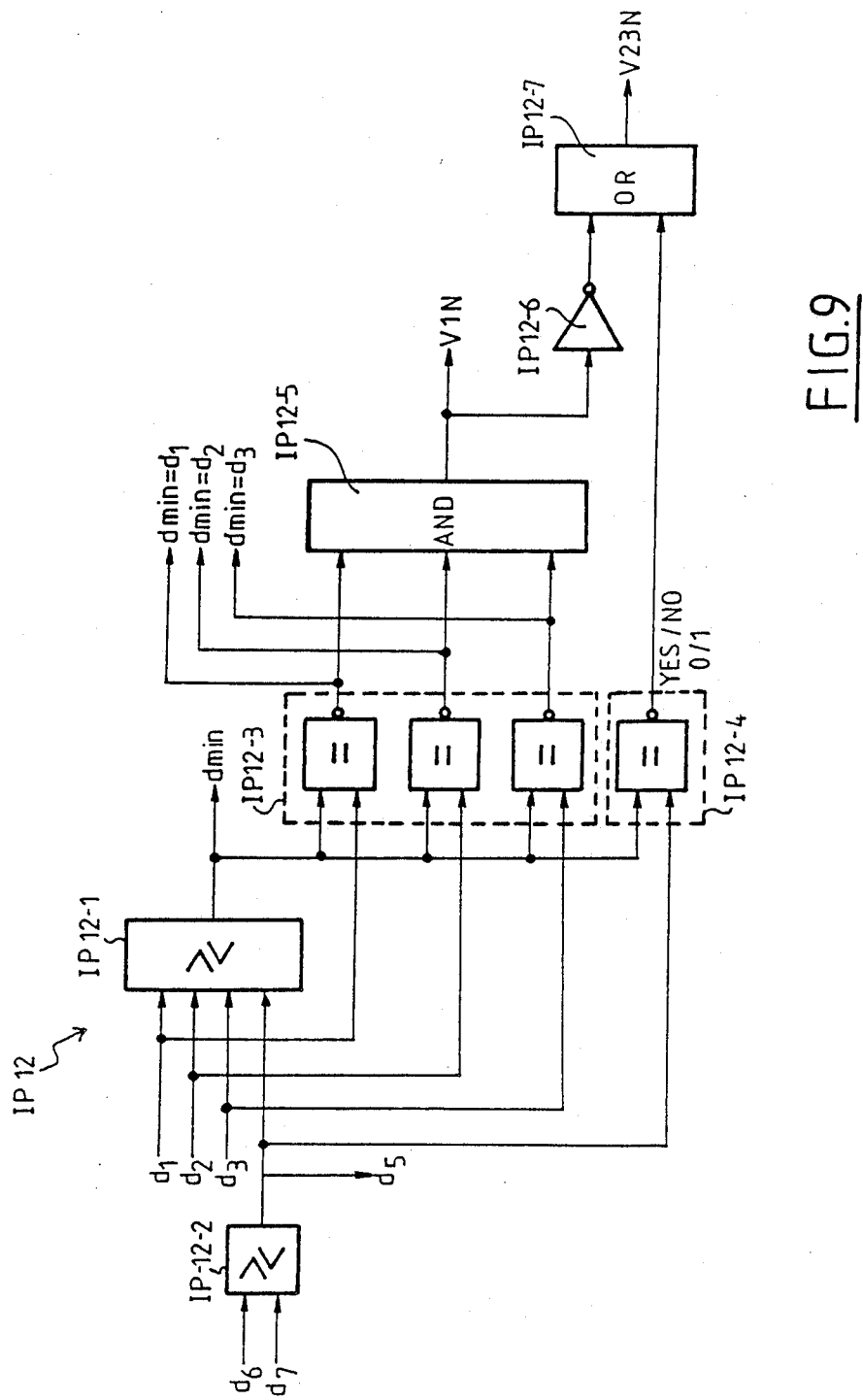

FIG. 9 shows the structure of the circuit IP12. The differences d1 to d3 are applied to a circuit IP12-1 whose symbol is the mathematical sign ">" superposed on the mathematical sign "<". This symbol illustrates a circuit which transfers that one of its inputs which has the lowest value.

The circuit IP12-2 has the same function and provides an output difference d5 which is thus the lesser of the difference means d6 and d7. The circuit IP12-1 then provides a difference dmin at its output which is the minimum of d1, d2, d3, and d5.

Inverting comparators IP12-3 compare this value dmin with each of the inputs d1 to d3 in order to indicate which one of them actually corresponds to the minimum, which information is required for first level interpolation. The outputs from the inverting comparators IP12-3 are at zero level if the comparison is true and at one level if the comparison is false. Thus, when one of three circuits in the block IP12-3 indicates that one of the values d1 to d3 is a minimum, the output from the inverted AND circuit references IP12-5 is capable of providing a signal V1N for enabling first level interpolation. This signal V1N is complemented by an inverting amplifier IP12-6.

In parallel, another inverting comparator circuit IP12-4 determines whether the difference d5 is equal to the minimum. If it is, and OR circuit IP12-7 having its inputs connected to the outputs from components IP12-4 and IP12-6 provides a signal V23N for enabling interpolation at some other level. This ensures that the first level is selected even if d3=d5=dmin, for example.

Figure 10:
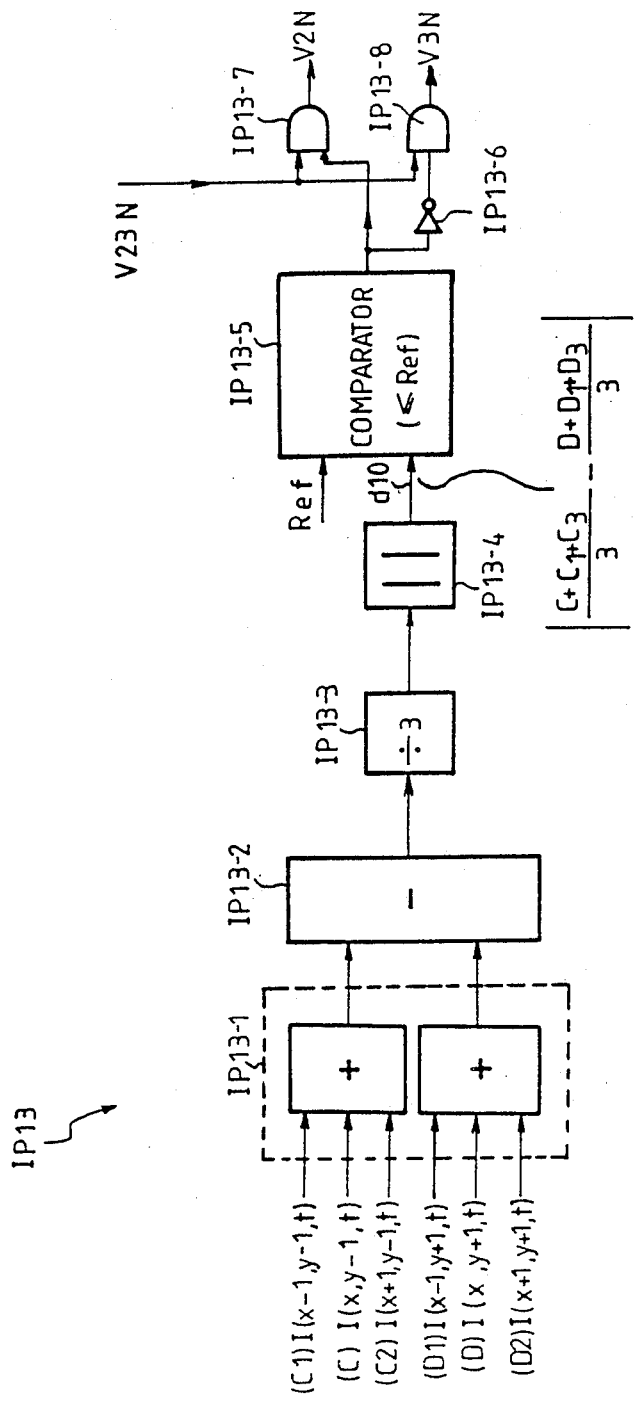

The circuit IP13 which selects between second level and third level interpolation is now described with reference to FIG. 10.

This selection makes use of main points C and D together with the auxiliary points which are closest on either side thereof, i.e. C1 and C2, and D1 and D2.

Adders IP13-1 followed by a subtractor IP13-2 and a divide-by-three circuit IP13-3 and a circuit IP13-4 for obtaining the absolute value provide a difference d10 which may be considered as being the weighted mean of the differences between the pair of main points C and D, and the pairs of auxiliary points C1 and D3, and also C3 and D1.

A comparator IP13-5 receives this difference d10 together with a reference signal. The output from the comparator varies depending on whether the difference d10 is less than or equal to the reference. This signal is applied directly to an AND gate IP13-7, and after inversion at IP13-8 to another AND gate IP13-6. The two AND gates also receive the signal V23N. Second level interpolation is enabled by the signal V2N if d10 is not less than the reference. Otherwise, the signal V3N enables third level interpolation.

The first level partial interpolation circuit IPN1 is now described with reference to FIG. 11.

The input signals thereto are the luminances of the main points C and D and also of the immediately adjacent auxiliary points C1, C2 and D1, D2. In addition, two weighted mean coefficients a and b whose sum is equal to 1 are also defined and are used in common with all of the interpolators to define the basic manner in which interpolation is performed. For example, a simple mean may be used, i.e. $a=b=\frac{1}{2}$, or only the upstream point may be taken into consideration, in which case $a=1$ and $b=0$. All types of intermediate solution may be envisaged.

Further, it would also be possible to vary the coefficients a and b dynamically within each interpolator, e.g. as a function of the weighted means or differences of the differences determining the action of the interpolators. Thus, multipliers IPN1-1 apply the coefficient a to main point C and to its auxiliary points and the coefficient b to main point D and to its auxiliary points.

Adders IPN1-2 sum the signals obtained for the two points in each pair. The sums obtained in this way have the form aC1+bD2, aC+bD, and aC2+bD1. These sums are applied to multiplexer IPN1-3.

Three signals arrive at the bottom of FIG. 1 indicating which one of the differences d1 to d3 gave rise to a minimum. If two of these differences are simultaneously at a minimum (two zero inputs for the truth table IPN1-4, given the inversion that occurs in the circuit IP12-4 of FIG. 9), then a signal dδ is produced. When it is equal to 1, this signal dδ indicates that an auxiliary first level partial interpolator should be used. It is applied to OR circuits IPN1-5 each of which also receives one of the inputs indicating which one of the differences d1 to d3 is at the minimum (with all the inputs using negative logic). Only one of the OR circuits IPN1-5 can then provide a low level output, and this is used to actuate the multiplexer IPN1-3 in order to select one of the three above-specified inputs, so as to provide space partial interpolation IS(x,y,t) for the point P.

It is not essential to use the signal dδ in order to implement first level auxiliary partial interpolation. The person skilled in the art is capable of designing other means for forcing one of the minima to act on the multiplexer IPN1-3 of FIG. 11 in the event of a conflict.

Figure 12:
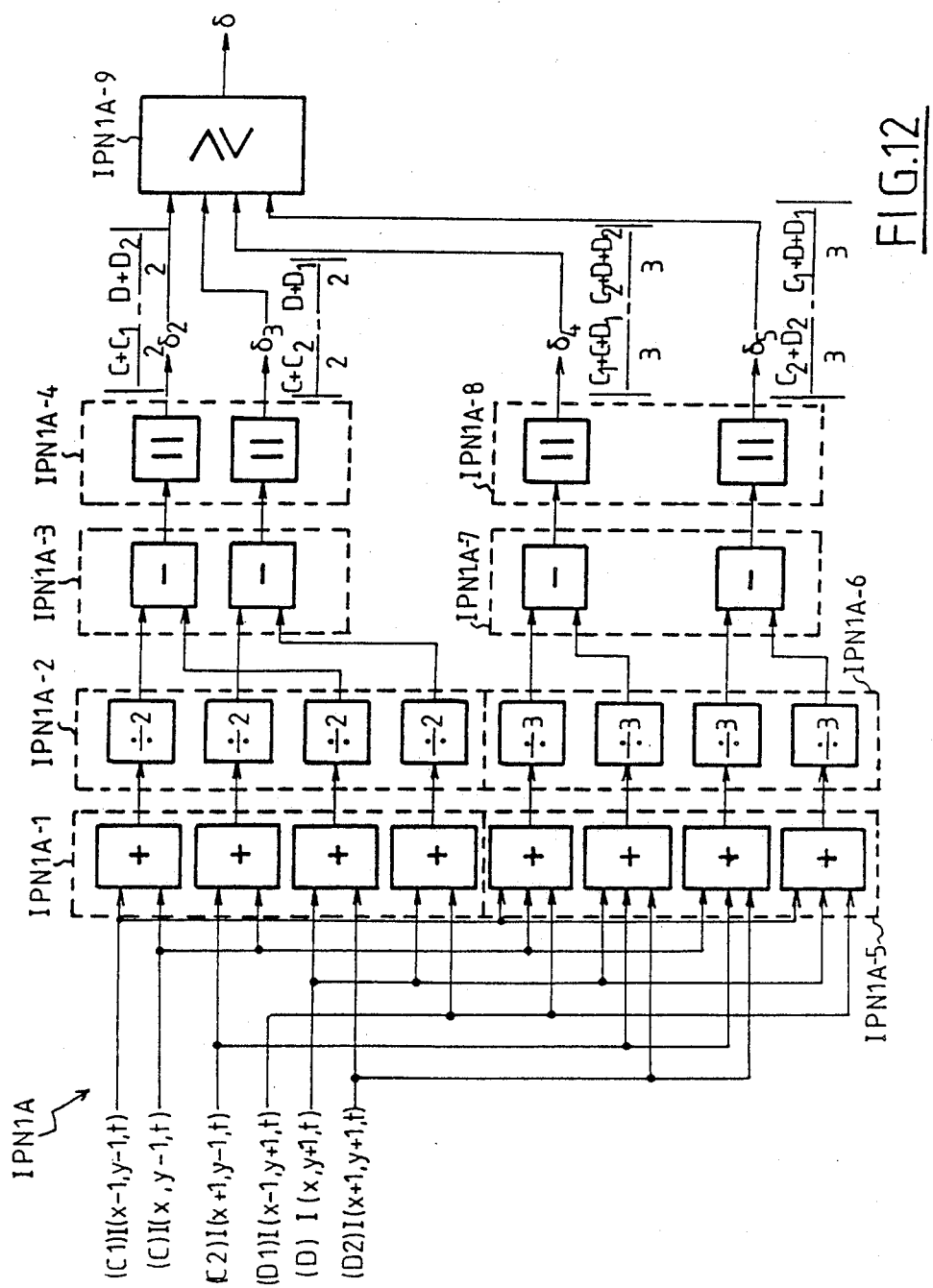

The first level auxiliary interpolator includes a first circuit IPN1A shown in FIG. 12. Here again, the inputs are the main points C and D together with the two auxiliary points closest to each of them.

Adders INP1A-1 are followed by divide-by-two circuits IPN1A-2, then by subtractors IPN1A-3 and circuits IPN1A-4 for taking the absolute value in order to provide two signals δ2 and δ3 respectively representing:

the mean of the differences or gradients between the pairs of points C and D and also C1 and D2; and the mean of the differences or gradients obtained between the pairs of points C and D, and also C2 and D1.

Further, adders IPN1A-5 are followed by divide-by-three circuits IPN1A-6 and then by subtractors IPN1A-7 and finally by circuits IPN1A-8 for taking the absolute value in order to provide two signals δ4 and δ5. These signals respectively represent:

the mean of the differences or gradients taken from pairs of points C and D, C1 and D2, and D1 and C2; and the mean of the differences or gradients taken from points C and D, C2 and D1, and D2 and C1.

The signals δ2 to δ5 are applied to a minimum detector IPN1A-9 which provides a signal δ.

Figure 13:
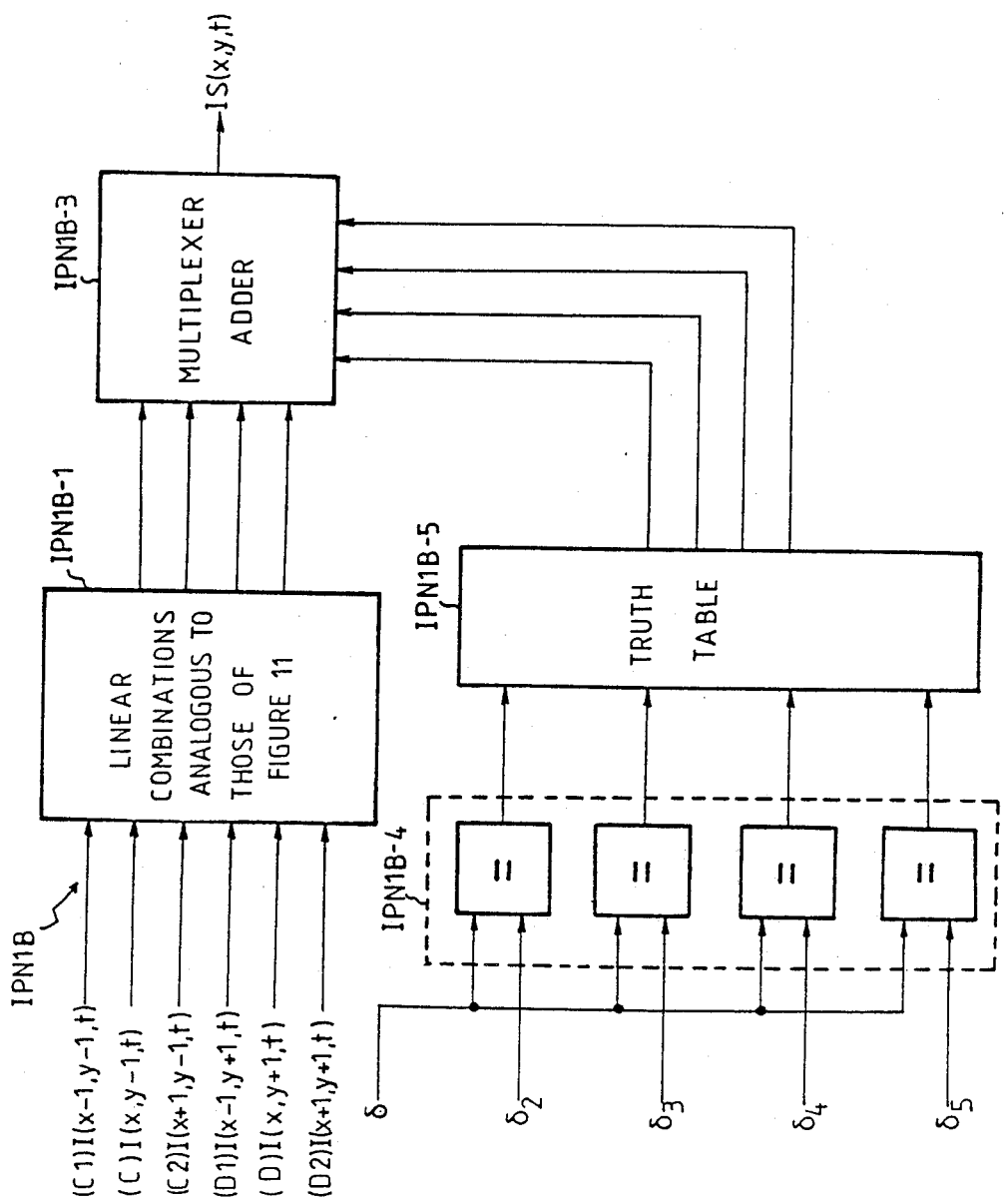

The second portion IPN1B of the first level auxiliary interpolator is shown in FIG. 13. Its circuit is similar to that of FIG. 11. The points available at the input are the same as in FIG. 11. These points are applied to a circuit IPN1B-1 which forms linear combinations analogous to those of FIG. 11, but operating on linear combinations of greater extent, having four weighting coefficients a, b, c, and d, where $a+b+c+d=1$.

These four linear combinations are applied to a summing multiplexer IMPN1B-3.

In addition, the three signals δ2 to δ5 together with the signal δ which is the minimum thereof are applied to comparators IPN1B-4 followed by a truth table IPN1B-5 which controls the summing multiplexer IPN1B-3 in order to provide an output signal which is the space partial interpolation, as follows:

if $\delta 2$ is minimum, $aC1+bC+cD+dD2$; and
if $\delta 3$ is minimum, $aC+bC2+cD1+dD$.

In the other two cases, only two coefficients are used a and b, with $a+b=1$. The interpolations are then:
if $\delta 4$ is minimum, $aC1+bD2$; and
if $\delta 5$ is minimum, $aC2+bD1$.

If there is still a conflict of minima, a mean of the interpolations deduced from all of the minima may be used.

The second level interpolator IPN2 of FIG. 7 is now considered. Its structure is very simple and is not shown in detail. When enabled, this interpolator merely has to perform interpolation having the form $aC+bD$, where $a+b=1$.

Figure 11:
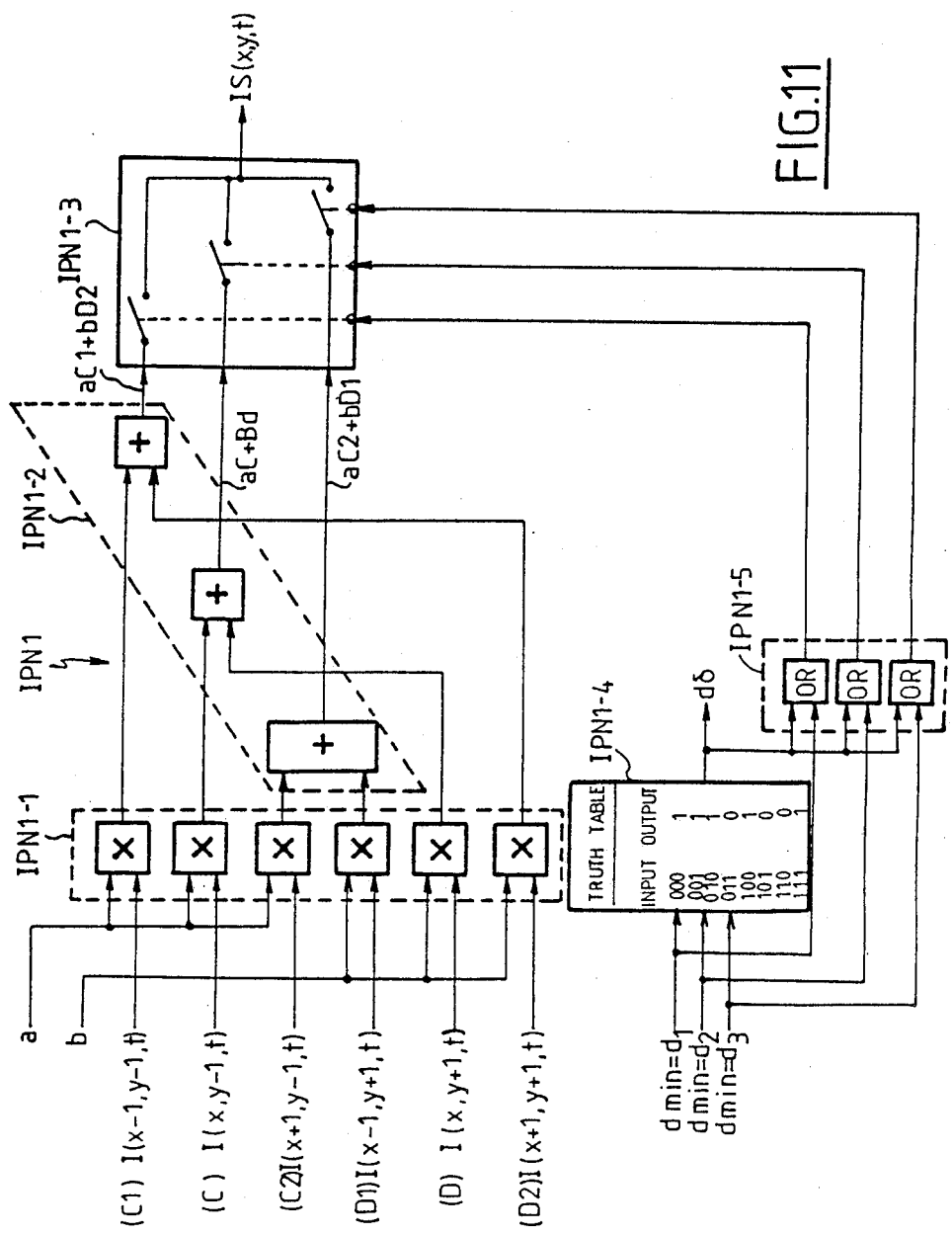
FIGS. 11 to 13 are more detailed diagrams of the circuits IPN1, IPN1A, and IPN1B, respectively, as shown in FIG. 7.

It will also be observed that this magnitude is already available within the circuits of FIG. 11.

The third level interpolator IPN3 is now considered, its general structure is similar to that of the first level partial interpolator and the like first level partial interpolator it may be accompanied by an auxiliary interpolator.

It is believed that the detailed diagram relating to the first level partial interpolator suffices to enable the person skilled in the art to establish a diagram for the third level interpolator, once the requisite functions have been defined. The following description is therefore restricted to these functions only.

It is recalled that third level interpolation is used if the detected outline is quasi-horizontal. In this case, a magnitude dmin3 is determined which is the miminum of differences d0, d4, and d5. The differences d0 to d4 (FIG. 8) relate to pairs of points C3 and D4, and C4 and D3, respectively. The difference d5 is the minimum of the differences d6 and d7 in FIG. 8. Begin by assuming that only one of these magnitudes is the minimum. Three situations can then arise:
if the minimum is d0, $IS=aC3+bD4$;
if the minimum is d4, $IS=aC4+bD3$; and
if the minimum is d5, $IS=aC+bD$.

In the event of a conflict (more than one minimum), a difference $\delta 3A$ can then be calculated which is defined as being the minimum of four magnitudes $\delta 30$, $\delta 31$, $\delta 34$, and $\delta 35$ which are themselves defined by the following equations (where the absolute value symbol has been omitted in order to simplify them):
$\delta 30 = 0.5(C3+C1) - 0.5(D2+D4)$
$\delta 31 = 0.5(C2+C4) - 0.5(D3+D1)$
$\delta 34 = 0.2(C3+C1+C+D1+D3) - 0.2(C2+C4+D+D2+D4)$
$\delta 35 = 0.5(C+C2+C4+D2+D4) - 0.2(C1+C3+D+D1+D3)$ The interpolation criteria are then as follows:
if $\delta 30$ is minimum, then $IS=aC3+bC1+cD2+dD4$; and
if $\delta 31$ is minimum, then $IS=aC2+bC4+cD3+dD1$.

In the above two equations, $a+b+c+d=1$.

In this case, and in the earlier cases using four parameters a, b, c, and d, it is possible to take either $a=b=\frac{1}{2}$ and $c=d=0$, or else $a=b=c=d=\frac{1}{4}$.

If $\delta 34$ is minimum, then $IS=aC3+bD4$.
If $\delta 35$ is minimum, then $IS=aC4+bD3$.

In the last two cases, $a+b=1$, either with $a=1$ or $b=0$, or else $a=b=\frac{1}{2}$.

If a minimum conflict remains with these $\delta$ magnitudes, it is again possible to take the mean of the interpolations deduced from all of the minima for this third level auxiliary interpolation.

As mentioned above, partial interpolations are performed in this manner for each of the four differences DT, DS, D$\phi$1, and D$\phi$2 described above.

Figure 14:
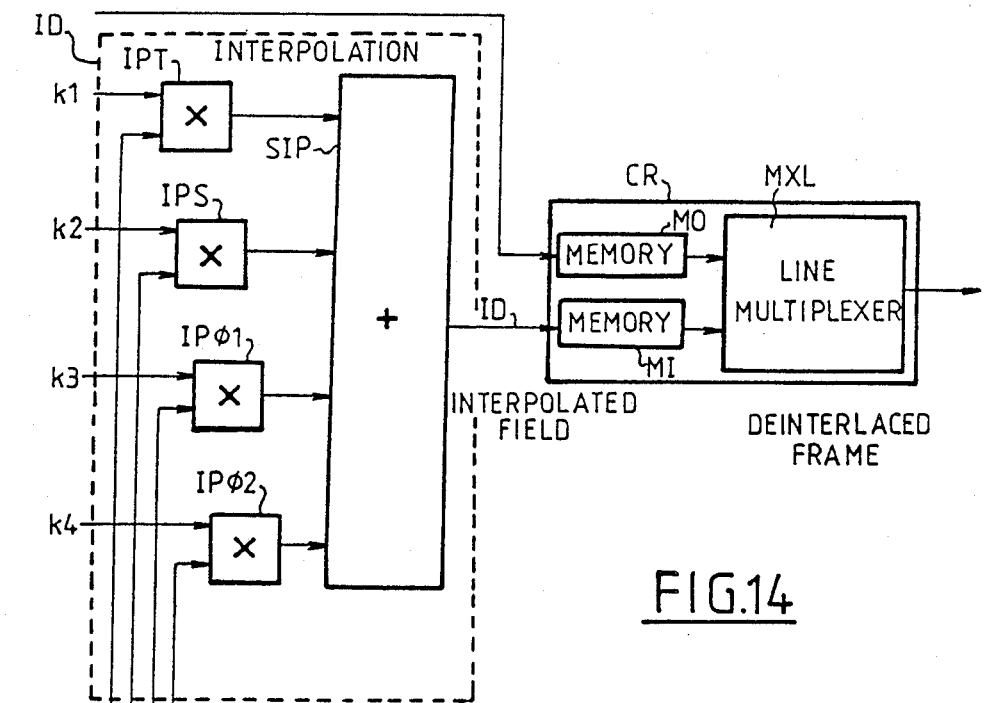
FIG. 14 is a more detailed diagram of the circuits ID and CR shown in FIG. 2.

As a result the corresponding partial interpolations IS, IT, I$\phi$1, and I$\phi$2 are obtained which are applied as first inputs to multipliers IPT, IPS, IP$\phi$1, and IP$\phi$2 (see FIG. 14), whose other inputs receive the above-described weighting coefficients k1 to k4 as multiplying factors. A circuit SIP provides the final interpolation of the point P.

The signals obtained in this way for the various interpolated points of a field are applied to an interpolation memory MI. The signals from the field memory MT1 (FIG. 3) are applied to an original point memory MO. A circuit XML then combines the original field made up of lines of original points and the interpolated field made up of lines of interpolated points in order to obtain a complete frame.

Figure 15:
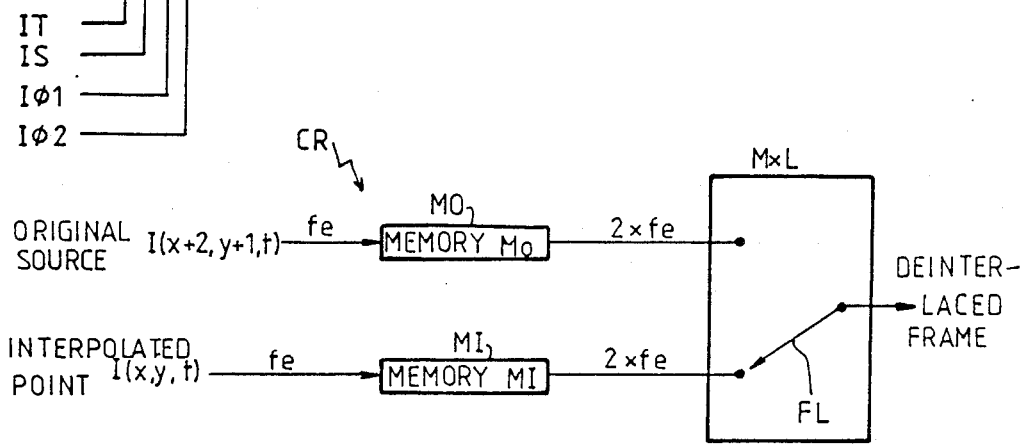
FIG. 15 is a more detailed diagram of the circuit CR as shown in FIG. 14.

This is shown better in the detailed diagram of FIG. 15. The memories MO and MI provide output signals at twice the line point sampling frequency, and these signals are applied to two inputs of a multiplexer. The multiplexer is simply constituted by a switch operating at line frequency and in synchronism with the line so as to provide a complete output signal relating to a deinterlaced frame obtained by combining original lines and interpolated lines.

The person skilled in the art will understand that the operation of apparatus in accordance with the invention has been described for a single point to be interpolated.

Sequential operation is obtained by repeating all of the above-described operations, increasing the x-coordinate of the point to be interpolated each time until the end of the line is reached, then by increasing its y-co-ordinate twice while returning its x-co-ordinate to zero, and repeating interpolation on the next line to be interpolated.

Initial experiments have been performed using the hierarchical interpolation means of the present invention, but using only two input gradients or differences, namely DT and DS. The hierarchical interpolation window occupies two lines of five points, in the manner described in detail above, i.e. two auxiliary points are taken from each side of each main point and account is taken only of pairs of auxiliary points situated in the lines which are adjacent on either side of the points to be interpolated.

The image quality obtained in this way was seen to be better than anything that could be obtained using either of the following techniques:

lowpass linear filtering with a vertical aperture of 11 frame lines and a time aperture of 7 fields, as described in the article by B. Choquet entitled "Inventaire des techniques de traitement d'images en conversion de norms de représentation pour la télévision haute définitition" mentioned above; and detecting motion by taking account of said gradient DT and DS, with interpolation either using a two line by three point window or else using a two line by five point window, with or without interpolation weighting.

The few residual defects observed when applying hierarchical interpolation according to the invention in the manner mentioned above were point-sized, i.e. errors were limited to single image points, and they were random, i.e. their space coordinates were arbitrary and different from one frame to the next. Such defects are very difficult to see and are not distracting in a sequence of moving images.

Further experiments have been performed using both hierarchical interpolation of the present invention and multi-gradient motion detection, i.e. using all four differences DT, DS, D$\phi$1, and D$\phi$2.

This gave rise to excellent definition in the deinterlaced frame, in particular by virtue of the interpolation facilities made available in diagonal space-time directions. This technique has made it possible to obtain deinterlaced images having no visible defects.

What is claimed is:

1. A method of processing picture signals having interlaced frame scanning, said method comprising the steps of:
   (1) selecting a current line having a given line-number, to be interpolated in a current frame;
   (2) selecting a new pixel to be interpolated at a given position-in-line in said current line;
   (3) selecting a plurality of pairs of existing main pixels, all having said given position-in-line, however in different lines or frames, said plurality of pairs comprising:
      a first pair of first main pixels having said given line-number, but being located temporarily in the frames preceding and following said current frame, respectively;
      a second pair of second main pixels, being located in the current frame, however spatially within lines having said given line-number plus one and minus one, respectively;
      a third pair of third main pixels comprising a pixel being located in said preceding frame, spatially within a line having said given line-number minus two, and a pixel being located in said following frame, spatially within a line having said given line-number plus two; and
      a fourth pair of fourth main pixels comprising a pixel being located in said preceding frame, spatially within a line having said given line-number plus two, and a pixel being located in said following frame, spatially within a line having said given line-number minus two;
   (4) calculating first, second, third and fourth main differences between the signals at said main pixels of said first, second, third and fourth pairs, respectively;
   (5) selecting a first group of at least two first auxiliary pixels, with position-in-line preceding and following respectively that of a first one of said first main pixels;
   (6) selecting a second group of at least two first auxiliary pixels, with position-in-line preceding and following respectively that of the other one of said first main pixels;
   (7) selectively re-arranging said first auxiliary pixels into at least two first auxiliary pairs of pixels, each comprising a pixel from said first group and a pixel from said second group;
   (8) calculating at least two first auxiliary differences between the signals at the two pixels of each first auxiliary pair;
   (9) determining the minimum one of said first main difference and said at least two first auxiliary differences;
   (10) determining both a first partial first-level interpolation across the pixels of that of those pairs which gives the minimum difference, and a first partial second-level interpolation across said first main pixels;
   (11) determining whether the space-time vicinity of said new pixel and said first main and auxiliary pixels contains a local contour being substantially parallel to the line scanning direction;
   (12) hierarchically selecting between said first partial first-level interpolation and said first partial second-level interpolation, depending upon whether said determination at step 11 is negative or positive, respectively;
   (13) selecting a first group of at least two second auxiliary pixels, with position-in-line preceding and following respectively that of a first one of said second main pixels;
   (14) selecting a second group of at least two second auxiliary pixels, with position-in-line preceding and following respectively that of the other one of said second main pixels;
   (15) selectively re-arranging said second auxiliary pixels into at least two second auxiliary pairs of pixels, each comprising a pixel from said first group and a pixel from said second group;
   (16) calculating at least two second auxiliary differences between the signals at the two pixels of each second auxiliary pair;
   (17) determining the minimum one of said second main difference and said at least two second auxiliary differences;
   (18) determining a second partial first-level interpolation across the pixels of that of those pairs which gives the minimum difference, and a second partial second-level interpolation across said second main pixels;
   (19) determining whether the space-time vicinity of said new pixel and said second main and auxiliary pixels contains a local contour being substantially parallel to the line scanning direction;
   (20) hierarchically selecting between said second partial first-level interpolation and said second partial second-level interpolation, depending upon whether said determination at step 19 is negative or positive, respectively;
   (21) selecting a first group of at least two third auxiliary pixels, with position-in-line preceding and following respectively that of a first one of said third main pixels;
   (22) selecting a second group of at least two third auxiliary pixels, with position-in-line preceding and following respectively that of the other one of said third main pixels;
   (23) selectively re-arranging said third auxiliary pixels into at least two third auxiliary pairs of pixels, each comprising a pixel from said first group and a pixel from said second group;
   (24) calculating at least two third auxiliary differences between the signals at the two pixels of each third auxiliary pair;
   (25) determining the minimum one of said third main difference and said at least two third auxiliary differences;
   (26) determining a third partial first-level interpolation across the pixels of that of those pairs which gives the minimum difference, and a third partial second-level interpolation across said third main pixels;
   (27) determining whether the space-time vicinity of said new pixel and third third main and auxiliary pixels contains a local contour being substantially parallel to the line scanning direction;

(28) hierarchically selecting between said third partial first-level interpolation and said third partial second-level interpolation, depending upon whether said determination at step 27 is negative or positive, respectively;

(29) selecting a first group of at least two fourth auxiliary pixels, with position-in-line preceding and following respectively that of a first one of said fourth main pixels;

(30) selecting a second group of at least two fourth auxiliary pixels, with position-in-line preceding and following respectively that of the other one of said fourth main pixels;

(31) selectively re-arranging said fourth auxiliary pixels into at least two fourth auxiliary pairs of pixels, comprising a pixel from said first group and a pixel from said second group;

(32) calculating at least two fourth auxiliary differences between the signals at the two pixels of each fourth auxiliary pair;

(33) determining the minimum one of said fourth main difference and said at least two fourth auxiliary differences;

(34) determining a fourth partial first-level interpolation across the pixels of that of those pairs which gives the minimum difference, and a fourth partial second-level interpolation across said fourth main pixels;

(35) determining whether the space-time vicinity of said new pixel and said fourth main and auxiliary pixels contains a local contour being substantially parallel to the line scanning direction;

(36) hierarchically selecting between said fourth partial first-level interpolation and said fourth partial second-level interpolation, depending upon whether said determination at step 35 is negative or positive, respectively; and

(37) calculating the final interpolated luminance of said new pixel from the hierarchically selected partial interpolations corresponding with said first, second, third and fourth main pairs, respectively.

2. Method according to claim 1, wherein:
upon any one of steps 9, 17, 25 and 33 giving two minimum differences being equal, said any one step further comprises seeking minimas in normed linear combinations of its own main and auxiliary differences, and
the corresponding one of steps 10, 18, 26 and 34 comprises determining its own partial first-level interpolation from that one of said normed linear combinations which is minimum.

3. Method according to claim 1, wherein:
each pair of steps 5-6, 13-14, 21-22 and 29-30 comprises selecting at least four different pixels in each one of said first and second groups of the concerned rank,
each of steps 7, 15, 23 and 31 comprises selectively re-arranging said auxiliary pixels of said first and second groups into at least four auxiliary pairs of pixels of the concerned rank,
each of steps 8, 16, 24 and 32 comprises calculating at least four auxiliary differences of the concerned rank, between the signals at the two pixels of each auxiliary pair of the concerned rank,
each of steps 9, 17, 25 and 33 further comprises determining the minimum one of said auxiliary differences between the furthest-apart pixels,
each of steps 10, 18, 26 and 34 further comprises determining a partial third-level interpolation of the concerned rank across the ones of said furthest-apart pixels which give the minimum difference, and each of steps 12, 20, 28 and 36 comprises hierarchically selecting between:
said partial first-level interpolation,
said partial second-level interpolation, or
said partial third-level interpolation, depending upon whether said space-time vicinity:
does not include a local contour being substantially or closely parallel to the line scanning direction,
does include a local contour being closely parallel to the line scanning direction, or
does include a local contour being only substantially, but not closely, parallel to the line scanning direction, respectively.

4. Method according to claim 1, wherein each of steps 11, 19, 27 and 35 comprises searching minima among said main and auxiliary differences and normed linear combinations thereof.

5. Method according to claim 4, wherein:
in each pair of steps 5-6, 13-14, 21-22 and 29-30, said auxiliary pixels of said first and second groups have position-in-line immediately preceding and following that of the concerned one of the concerned main pixels, respectively;
in each of steps 11, 19, 27 and 35, said normed linear combinations thereof comprise at least one normed cross-difference relating to said auxiliary pixels of the concerned rank; and
each of steps 12, 20, 28 and 36 comprises selecting the partial first-level interpolation of the concerned rank or the partial second-level interpolation of the concerned rank, depending upon whether said normed cross-difference is not or is the minimum one, respectively.

6. Method according to claim 3, wherein:
in each pair of steps 5-6, 13-14, 21-22 and 29-30, said auxiliary pixels of said first and second groups have position-in-line immediately preceding and following that of the concerned one of the concerned main pixels, respectively;
in each of steps 11, 19, 27 and 35, said normed linear combinations thereof comprise at least one normed cross-difference relating to said auxiliary pixels of the concerned rank;
each of steps 12, 20, 28 and 36 comprises selecting the partial first-level interpolation of the concerned rank or the partial second-level interpolation of the concerned rank, depending upon whether said normed cross-difference is not or is the minimum one, respectively;
each of steps 11, 19, 27 and 35 further comprises comparing an additive normed linear combination of main and auxiliary differences with a reference value; and
each of steps 12, 20, 28 and 36 comprises selecting the partial first-level interpolation of the concerned rank if said normed cross-difference is not the minimum one, or otherwise selecting the partial second-level interpolation of the concerned rank or the partial third-level interpolation of the concerned rank, depending upon said comparison with a reference value.

7. Method according to claim 1, wherein said step 37 comprises a weighted recombination of partial interpolations performed for each main pair as a function of the amplitude of said corresponding main difference relative to the sum of all main differences.

8. Method according to claim 1, further comprising the step of selectively repeating steps 1 through 37 for each pixel in each line to be interpolated, and recombining all interpolated pixel lines with initial frame lines into a de-interlaced frame.

9. Device for processing picture signals having interlaced frame scanning, comprising:
   input means for sequentially receiving pixel signals, each corresponding to an incident pixel at an incident position-in-line within an incident line having an incident line number in an incident frame;
   memory means adapted to sequentially and selectively store said pixel signals over at least two frame periods plus four line numbers plus at least two positions-in-line before said incident pixel;
   said memory means having outputs adapted to dynamically define a new pixel to be interpolated, with regard to said incident pixel;
   said new pixel being in at least one current frame before said incident frame, in a current line having a fgiven line-number being equal or less than said incident line number minus two, at a given position-in-line at least one position-in-line before said incident position-in-line;
   said outputs of said memory means being adapted to deliver a plurality of pairs of existing main pixels, all having said given position-in-line, however in different lines or frames, said plurality of pairs comprising:
      a first pair of first main pixels having said given line-number, but being located temporally in the frames preceding and following said current frame, respectively;
      at least two first auxiliary pairs of pixels, selected from
         a first group of at least two first auxiliary pixels, with position-in-line preceding and following respectively that of a first one of said first main pixels; and
         a second group of at least two first auxiliary pixels, with position-in-line preceding and following respectively that of the other one of said first main pixels, said first auxiliary pixels being selectively re-arranged into at least two said first auxiliary pairs of pixels, each comprising a pixel from said first group and a pixel from said second group;
      a second pair of second main pixels, being located in the current frame, however spatially within lines having said given line-number plus one and minus one, respectively;
      at least two second auxiliary pair of pixels selected from:
         a first group of at least two second auxiliary pixels, with position-in-line preceding and following respectively that of a first one of said second main pixels; and
         a second group of at least two second auxiliary pixels, with position-in-line preceding and following respectively that of the other one of said second main pixels, said second auxiliary pixels being selectively re-arranged into at least two second auxiliary pairs of pixels, each comprising a pixel from said first group and a pixel from said second group;
      a third pair of third main pixels comprising a pixel being located in said preceding frame, spatially within a line having said given line-number minus two, and a pixel being located in said following frame, spatially within a line having said given line-number plus two,
      at least two third auxiliary pairs of pixels selected from:
         a first group of at least two third auxiliary pixels, with position-in-line preceding and following respectively that of a first one of said third main pixels; and
         a second group of at least two third auxiliary pixels, with position-in-line preceding and following respectively that of the other one of said third main pixels, said third auxiliary pixels being selectively re-arranged into at least two third auxiliary pairs of pixels, each comprising a pixel from said first group and a pixel from said second group, and
      a fourth pair of fourth main pixels comprising a pixel being located in said preceding frame, spatially within a line having said given line-number plus two, and a pixel being located in said following frame, spatially within a line having said given line-number minus two,
      at least two fourth auxiliary pairs of pixels selected from:
         a first group of at least two fourth auxiliary pixels, with position-in-line preceding and following respectively that of a first one of said fourth main pixels; and
         a second group of at least two fourth auxiliary pixels, with position-in-line preceding and/or following respectively that of the other one of said fourth main pixels, said fourth auxiliary pixels being selectively re-arranged into at least two fourth auxiliary pair of pixels, comprising a pixel from said first group and a pixel from said second group;
   first processing means adapted to:
      calculate first, second, third and fourth main differences between the signals at said main pixels of said first, second, third and fourth pairs, respectively;
      calculate at least two first auxiliary differences between the signals at the two pixels of each first auxiliary pair;
      determine the minimum one of said first main difference and said at least two first auxiliary differences;
      determine a first partial first-level interpolation across the pixels of that of those pairs which gives the minimum difference, and a first partial second-level interpolation across said first main pixels;
      calculate at least two second auxiliary differences between the signals at the two pixels of each second auxiliary pair;
      determine the minimum one of said second main difference and said at least two second auxiliary differences;
      determine a second partial first-level interpolation across the pixels of that of those pairs which gives the minimum difference, and a second partial second-level interpolation across said second main pixels;
      calculate at least two third auxiliary differences between the signals at the two pixels of each third auxiliary pair;

determine the minimum one of said third main differences and said at least two third auxiliary differences;

determine a third partial first-level interpolation across the pixels of that of those pairs which gives the minimum difference, and a third partial second-level interpolation across said third main pixels;

calculate at least two fourth auxiliary differences between the signals at the two pixels of each fourth auxiliary pair;

determine the minimum one of said fourth main difference and said at least two fourth auxiliary differences; and determine a fourth partial first-level interpolation across the pixels of that of those pairs which gives the minimum difference, and a fourth partial second-level interpolation across said fourth main pixels; and second processing means adapted to:

hierarchically select between said first partial first-level interpolation and said first partial second-level interpolation, depending upon the result of a search of minima amongst said first main and auxiliary differences and normed linear combinations thereof;

hierarchically select between said second partial first-level interpolation and said first partial second-level interpolation, depending upon the result of a search of minima amongst said second main and auxiliary differences and normed linear combinations thereof;

hierarchically select between said third partial first-level interpolation and said third partial second-level interpolation, depending upon the result of a search of minima amongst said third main and auxiliary differences and normed linear combinations thereof;

hierarchically select between said fourth partial first-level interpolation and said first partial second-level interpolation, depending upon the result of a search of minima amongst said fourth main and auxiliary differences and normed linear combinations thereof; and calculate the final interpolated luminance of said new pixel from the weighted recombination of partial interpolations performed for each main pair as a function of the amplitude of said corresponding main difference relatively to the sum of all main differences.

10. Device according to claim 9, wherein, upon said first processing means determining a plurality of minimum differences of any one of said main and at least two corresponding auxiliary differences being equal, said first processing means seeks minimas in normed linear combinations of said any one of said main and at least two corresponding auxiliary differences, and determine the corresponding partial first-level interpolation from that one of said normed linear combinations which is minimum.

11. Device according to claim 9, wherein, for each rank, said auxiliary pixels of said first and second groups have position-in-time immediately preceding and following that of the concerned one of the concerned main pixels, respectively, said second processing means seeks minima amongst said main and auxiliary differences of the concerned rank and at least one normed cross-difference relating to said auxiliary pixels of the concerned rank, and said second processing means selects the partial first-level interpolation of the concerned rank or the partial second-level interpolation of the concerned rank, depending upon whether said normed cross-difference is not or is the minimum one, respectively.

12. Device according to claim 11, wherein said memory means is adapted to deliver at least four different pixels in each one of said first and second groups of the concerned rank, said auxiliary pixels of said first and second groups being selectively re-arranged into at least four auxiliary pairs of pixels of the concerned rank, wherein said first processing means:

calculates at least four auxiliary differences of the concerned rank, between the signals at the two pixels of each auxiliary pair of the concerned rank;

further determines the minimum one of said auxiliary differences between the furthest-apart pixels; and further determines a partial third-level interpolation of the concerned rank across the ones of said furthest apart pixels which give the minimum difference; and said second processing means:

upon said normed cross-difference is the minimum one, further compares an additive normed linear combination of concerned main and auxiliary differences with a reference value; and further selects between the partial second-level interpolation of the concerned rank or the partial third-level interpolation of the concerned rank, depending upon said comparison with a reference value.

13. Device according to claim 9, wherein each partial interpolation is the weighted mean of two pixels or groups of pixels on which said interpolation is performed.

14. Device according to claim 13, wherein each partial interpolation is copied from one of said two pixels or groups of pixels on which said interpolation is performed.

15. Device according to claim 13, wherein each partial interpolation is the half sum of the signals of said two pixels or groups of pixels on which said interpolation is performed.

16. Device according to claim 13, further comprising means for establishing said weighted mean in a manner which is common for all partial interpolations.

17. Device according to claim 9, further comprising memory and switching means for recombining all interpolated pixel lines with incident lines into a de-interlaced frame.

18. A method of deinterlacing scanned picture signals having interlaced field scanning, the method comprising the following steps:

selecting a time pair and a space pair of main points about a desired point in a line to be interpolated in a field being interpolated, said time pair having the same position in the image as the desired point, but being situated in the two fields occurring immediately before and immediately after the field being interpolated, while said space pair come from respective ones of two positions which are vertically adjacent to the position of the desired point in the field being interpolated;

calculating a "time" main difference between the signals at the two points in said time pair, and also a "space" main difference between the signals at the two points in said space pair;

selecting auxiliary points situated on the same frame line as said space pair and suitable for defining auxiliary pairs of points on either side of the desired point;

calculating auxiliary differences between the signals at each of said pairs of points;

determining first level partial interpolation in that one of the directions between the main pair and the associated auxiliary pairs which provides a minimum difference;

determining a second level partial interpolation in the direction of the pair of main points;

performing, at least on said time pair and said space pair, hierarchical selection between first level partial interpolation and second level partial interpolation, as a function of whether a zone including said desired point contains a local outline which is horizontal; and calculating a final interpolated luminance of said desired point from the partial interpolations each relating to said time pair and said space pair of main points.

* * * * *